United States Patent
Hokazono et al.

(10) Patent No.: US 11,840,976 B2
(45) Date of Patent: Dec. 12, 2023

(54) CONTROL DEVICE FOR ENGINE

(71) Applicant: Mazda Motor Corporation, Hiroshima (JP)

(72) Inventors: Tohru Hokazono, Aki-gun (JP); Kota Maekawa, Aki-gun (JP); Masaharu Marumoto, Aki-gun (JP); Kazuaki Narahara, Aki-gun (JP); Chinami Morishima, Aki-gun (JP)

(73) Assignee: Mazda Motor Corporation, Hiroshima (JP)

( * ) Notice: Subject to any disclaimer, the term of this patent is extended or adjusted under 35 U.S.C. 154(b) by 0 days.

(21) Appl. No.: 17/891,786

(22) Filed: Aug. 19, 2022

(65) Prior Publication Data
US 2023/0062098 A1    Mar. 2, 2023

(30) Foreign Application Priority Data
Aug. 30, 2021  (JP) ................ 2021-140469

(51) Int. Cl.
*F02D 41/26* (2006.01)
*F02D 13/02* (2006.01)
(Continued)

(52) U.S. Cl.
CPC ........ *F02D 41/263* (2013.01); *B60H 1/3208* (2013.01); *F02B 29/0412* (2013.01);
(Continued)

(58) Field of Classification Search
CPC .. F02D 41/263; F02D 41/002; F02D 41/3047;
F02D 41/3041; F02D 41/401; F02D 13/0207; F02D 13/0215; F02D 13/0226; F02D 13/0234; F02D 13/0246; F02D 13/0249; F02D 35/023; F02D 2041/001; F02D 2041/0015;
(Continued)

(56) References Cited

U.S. PATENT DOCUMENTS
2017/0276098 A1    9/2017  Tanaka et al.

FOREIGN PATENT DOCUMENTS
JP    2004518842    *  6/2004  ............. F02D 41/04
JP    2004245085    *  9/2004  ............. F02D 41/04
(Continued)

*Primary Examiner* — Hai H Huynh
(74) *Attorney, Agent, or Firm* — Alleman Hall Creasman & Tuttle LLP

(57) ABSTRACT

A control device for an engine is provided, which includes a combustion chamber formed by a cylinder and a piston, an intake air amount adjuster that adjusts an intake air amount supplied to the combustion chamber, a controller switchable of a combustion mode between a fuel-lean first combustion mode and a stoichiometric second combustion mode based on an engine operating state, and an intake air cooler that cools the intake air supplied to the combustion chamber. The controller controls the intake air cooler to start intake air cooling in response to a request for switching the combustion modes, and after the intake air cooling is started, controls the intake air amount adjuster to start the switching of the combustion modes, and then controls the intake air cooler and the intake air amount adjuster so that the switching of the combustion modes ends after the intake air cooling is finished.

20 Claims, 11 Drawing Sheets

(51) Int. Cl.
  *F02B 29/04*   (2006.01)
  *F02D 41/00*   (2006.01)
  *B60H 1/32*    (2006.01)

(52) U.S. Cl.
  CPC ...... *F02B 29/0443* (2013.01); *F02B 29/0493* (2013.01); *F02D 13/0207* (2013.01); *F02D 13/0215* (2013.01); *F02D 13/0226* (2013.01); *F02D 13/0234* (2013.01); *F02D 13/0246* (2013.01); *F02D 13/0249* (2013.01); *F02D 41/0002* (2013.01); *F02D 2200/04* (2013.01)

(58) Field of Classification Search
  CPC ..... F02D 2200/0406; F02D 2200/0414; F02D 2200/04; B60H 1/3208; F02B 29/0412; F02B 29/0443; F02B 29/0493
  USPC .......................... 123/339.17, 563, 399, 90.15
  See application file for complete search history.

(56) References Cited

FOREIGN PATENT DOCUMENTS

| | | | | |
|---|---|---|---|---|
| JP | 2005030225 | * | 2/2005 | ............. F02D 13/02 |
| JP | 3690078 | * | 8/2005 | ......... F02D 41/0002 |
| JP | 2017180111 A | | 10/2017 | |

\* cited by examiner

CONTROL DEVICE FOR ENGINE

TECHNICAL FIELD

The technology disclosed herein relates to a control device for an engine.

BACKGROUND OF THE DISCLOSURE

In recent years, although electrically-driven vehicles, such as electric automobiles, have gained popularity, there are still many vehicles that use an engine as a power source. Further, demands for engines, such as a further improvement in thermal efficiency, are still high.

For example, JP2017-180111A discloses an engine which is able to switch, according to the operating range, between a lean mode in which a mixture gas combusts at an air-fuel ratio leaner than a stoichiometric air-fuel ratio, and a stoichiometric mode in which the mixture gas combusts at the stoichiometric air-fuel ratio.

Further, the engine disclosed in JP2017-180111A is configured to operate a cooling system to cool intake air, when switching to the lean mode from the stoichiometric mode. In detail, according to this engine, the intake air cooling is started in response to an issue of a request for switching from the stoichiometric mode to the lean mode, and the intake air cooling is ended after the changing of the air-fuel ratio is finished.

According to JP2017-180111A, the control accuracy of the air-fuel ratio can be improved particularly in the lean mode by performing the intake air cooling when switching from the stoichiometric mode to the lean mode.

Meanwhile, when switching between a first combustion mode in which the air-fuel ratio is lean and a second combustion mode in which the air-fuel ratio is at the stoichiometric air-fuel ratio, the air-fuel ratio passes through an intermediate air-fuel ratio (A/F) ($1<\lambda<2$) at the time of the transitioning between these modes. This intermediate A/F is inconvenient for reducing $NO_x$ emissions because $NO_x$ cannot be removed by a catalyst at this A/F.

SUMMARY OF THE DISCLOSURE

The technology disclosed herein is made in view of this regard, and one purpose thereof is to reduce a $NO_x$ emission when transitioning between a combustion mode in which an air-fuel ratio is lean and a combustion mode in which the air-fuel ratio is at the stoichiometric air-fuel ratio.

Generally, a generating amount of NO depends on an in-cylinder temperature. For example, when the in-cylinder temperature is low, since it is difficult to bond nitrogen and oxygen, it becomes possible to suppress the generation of NO as compared with a case where the in-cylinder temperature is high.

Thus, the present inventors considered to conduct intake air cooling when transitioning between the modes in order to reduce the in-cylinder temperature. Further, as a result of examining the intake air cooling from a viewpoint different from JP2017-180111A, they conceived an idea of a configuration suitable for reducing the NO emission, and reached the present invention.

In detail, according to a first aspect of the present disclosure, a control device for an engine is provided, which includes a combustion chamber formed by a cylinder and a piston inside the cylinder, an intake air amount adjuster that adjusts an amount of intake air supplied to the combustion chamber, the intake air amount adjuster including at least one of a valve operating mechanism and a throttle valve, and a controller that controls the intake air amount adjuster to switch a combustion mode, based on an operating state of the engine, between a first combustion mode in which a mixture gas is combusted at a first air-fuel ratio leaner than a stoichiometric air-fuel ratio, and a second combustion mode in which the mixture gas is combusted at a second air-fuel ratio equal to the stoichiometric air-fuel ratio.

Further, the device includes an intake air cooler that cools intake air supplied to the combustion chamber. The controller controls the intake air cooler to start cooling of intake air, in response to issuance of a request for switching the combustion mode between the first combustion mode and the second combustion mode, after the intake air cooler begins the cooling of intake air. The controller controls the intake air amount adjuster to start the switching of the combustion mode. The controller controls the intake air cooler and the intake air amount adjuster so that the switching of the combustion mode is finished after the cooling of intake air by the intake air cooler is finished.

According to this configuration, the controller starts the intake air cooling before starting the switching between the modes. Thus, since the adjustment of the air-fuel ratio can be started after reducing the in-cylinder temperature to some extent, it becomes advantageous for suppressing the generation of NOR.

Further, according to this configuration, the controller finishes the adjustment of the air-fuel ratio after the intake air cooling is finished. Therefore, the adjustment of the air-fuel ratio can be finished in the state where the intake air temperature is fully lowered, for example, as compared with a configuration in which the adjustment of the air-fuel ratio is finished before the intake air cooling is finished. The effect of suppressing $NO_x$ by the intake air cooling is utilized without waste when adjusting the air-fuel ratio. Thus, $NO_x$ emissions can be reduced more than in the conventional technique.

According to a second aspect of the present disclosure, the controller may be able to switch to a transition mode to control the intake air amount adjuster so that the air-fuel ratio inside the combustion chamber is transitioned between the first air-fuel ratio and the second air-fuel ratio. The controller may perform the switching of the combustion mode between the first combustion mode and the second combustion mode by the intake air amount adjuster via the transition mode, and end the intake air cooling by the intake air cooler during the transition mode.

According to this configuration, the controller ends the intake air cooling by the intake air cooler in the middle of the transition mode. Thus, the period of cooling by the intake air cooler and the execution period of the transition mode overlap with each other at least in part. Therefore, the period after starting the intake air cooling until finishing the transition mode can be shortened as much as possible. As a result, the switching between the modes can be performed in a shorter time, while fully securing the cooling period of intake air.

According to a third aspect of the present disclosure, when the request for switching the combustion mode is issued, the controller may calculate, based on the operating state of the engine, a first residual air amount that remains inside an intake passage downstream of the intake air cooler after the intake air cooling by the intake air cooler is started, and a first consumption air amount that is consumed by the time the switching of the combustion mode begins. When the first consumption air amount is less than the first residual air amount, the controller may start the switching of the combustion mode, in response to a determination that a number of cycles of the engine that passed after the calculation of the first consumption air amount and the first residual air amount exceeds a given first number of cycles. When the first consumption air amount is larger than the first residual air amount, the controller may start the switching of the combustion mode, regardless of the number of cycles.

For example, if the first consumption air amount is less than the first residual air amount, non-cooled air (hereinafter, may also be referred to as "normal air") remains downstream of the intake air cooler at the timing of the amount of air which is equivalent to the first consumption air amount being consumed (i.e., when the start of the switching between the first combustion mode and the second combustion mode becomes possible). Normal air is higher in temperature compared with air which has already been cooled by the intake air cooler (hereinafter, may also be referred to as "cooled air").

Therefore, if the switching between the first combustion mode and the second combustion mode is started in a state where the normal air remains, hot (normal) air will be supplied to the combustion chamber, which is inconvenient for suppressing the generation of NOR.

Thus, according to this configuration, when the first consumption air amount is less than the first residual air amount, the controller stands by without starting the switching between the first combustion mode and the second combustion mode until the number of cycles exceeds the given first number of cycles. By waiting for the first number of cycles, the switching between the first combustion mode and the second combustion mode can be started in a state where the cooled air is filled in the intake passage. Therefore, the generation of NO can further be suppressed.

On the other hand, if the first consumption air amount is larger than the first residual air amount, at the timing of the amount of air which is equivalent to the first consumption air amount being consumed and when the start of the switching between the first combustion mode and the second combustion mode becomes possible, the normal air does not remain in the intake passage downstream of the intake air cooler, but the intake passage is filled with the cooled air.

Thus, according to this configuration, when the first consumption air amount is larger than the first residual air amount, the controller promptly starts the switching between the first combustion mode and the second combustion mode, regardless of the number of cycles of the engine. Therefore, the switching between the modes can be performed as promptly as possible.

According to a fourth aspect of the present disclosure, the controller may calculate the first number of cycles based on the first consumption air amount.

If the first consumption air amount is small, it is considered that a large amount of normal air remains at the timing of the start of the switching between the first combustion mode and the second combustion mode becoming possible. In this case, it is considered that the first number of cycles should be set relatively high. Further, if the first consumption air amount is large, it is considered that a small amount of normal air remains at the timing of the start of the switching between the first combustion mode and the second combustion mode becoming possible. In this case, it is considered that the first number of cycles can be set relatively low.

Thus, the first consumption air amount can be associated with the first number of cycles. Therefore, according to this configuration, it becomes possible to calculate the first number of cycles based on the first consumption air amount. As described, the first number of cycles can be set appropriately.

According to a fifth aspect of the present disclosure, the controller may calculate, based on the operating state of the engine, a second residual air amount that remains inside the intake passage downstream of the intake air cooler after the switching of the combustion mode is started, and a second consumption air amount that is consumed by the time the switching of the combustion mode is ended. When the second consumption air amount is larger than the second residual air amount, the controller may suspend the intake air cooling by the intake air cooler, in response to a determination that a number of cycles of the engine after the calculation of the second consumption air amount and the second residual air amount exceeds a given second number of cycles. When the second consumption air amount is less than the second residual air amount, the controller may suspend the intake air cooling by the intake air cooler, regardless of the number of cycles.

For example, if the second consumption air amount is larger than the second residual air amount, the cooled air does not remain downstream of the intake air cooler at the timing of the air amount equivalent to the second consumption air amount being consumed (i.e., when the completion of the switching between the first combustion mode and the second combustion mode becomes possible).

Therefore, if the intake air cooling is shut down immediately in the state where no cooled air remains, and the switching between the first combustion mode and the second combustion mode is finished, since hot normal air will be supplied to the combustion chamber, it is inconvenient for suppressing the generation of NOR.

Thus, according to this configuration, if the second consumption air amount is larger than the second residual air amount, the controller continues the intake air cooling without suspension until the number of cycles exceeds the given second number of cycles. Thus, after the intake air cooling is continued over a certain period, the switching between the first combustion mode and the second combustion mode can be finished. As a result, the generation of $NO_x$ can further be suppressed.

On the other hand, if the second consumption air amount is less than the second residual air amount, at the timing of the air amount equivalent to the second consumption air amount being consumed and when the completion of the switching between the first combustion mode and the second combustion mode becomes possible, the low-temperature cooled air remains in the intake passage downstream of the intake air cooler.

Thus, according to this configuration, if the second consumption air amount is less than the second residual air amount, the controller immediately ends the switching between the first combustion mode and the second combustion mode, regardless of the number of cycles of the engine. Therefore, the switching between the modes can be performed as promptly as possible.

According to a sixth aspect of the present disclosure, the controller may calculate the second number of cycles based on the second consumption air amount.

If the second consumption air amount is small, it is considered that a large amount of cooled air remains at the timing of the completion of the switching between the first combustion mode and the second combustion mode becoming possible. In this case, the second number of cycles can be set relatively low. On the other hand, if the second consumption air amount is large, it is considered that a small amount of cooled air remains at the timing of the completion of the switching between the first combustion mode and the second combustion mode becoming possible. In this case, it is considered that the second number of cycles should be set relatively high.

Thus, according to this configuration, since the second consumption air amount can be associated with the second number of cycles, it is possible to calculate the second number of cycles based on the second consumption air amount. Therefore, the second number of cycles can be set appropriately.

According to a seventh aspect of the present disclosure, the second combustion mode may be performed on a high-load side of the first combustion mode. When a request for switching the combustion mode from the second combustion mode to the first combustion mode is issued, the controller may control a cooling capability of intake air by the intake air cooler so that the cooling capability before starting the switching of the combustion mode from the second combustion mode to the first combustion mode becomes higher than the cooling capability after the start of the switching of the combustion mode from the second combustion mode to the first combustion mode.

When the second combustion mode is performed on the high-load side, the in-cylinder temperature becomes relatively higher as compared with the first combustion mode on the low-load side. In this case, in order to suppress the generation of $NO_x$ more certainly when switching from the second combustion mode to the first combustion mode, it is necessary to reduce the in-cylinder temperature more promptly, as compared with the case of switching from the first combustion mode to the second combustion mode.

In this regard, according to this configuration, the controller sets the cooling capability relatively high at a relatively early timing before the mode change. By improving the cooling capability earlier, the in-cylinder temperature can be reduced more promptly and more certainly.

According to an eighth aspect of the present disclosure, the intake air cooler may be comprised of an air conditioner that air-conditions inside a cabin of a vehicle, the air conditioner including an air passage that guides air to the cabin, a compressor that discharges refrigerant, an evaporator that cools the air by heat exchange with the refrigerant, and a refrigerant passage that circulates the refrigerant through the compressor and the evaporator. A heat exchanger of the evaporator may be divided into a first heat exchanger and a second heat exchanger that are independent from each other. The air passage may include a first division passage where the first heat exchanger is disposed, and a second division passage where the second heat exchanger is disposed. An intake system that supplies intake air to the combustion chamber through the intake passage of the engine may perform the cooling of intake air by utilizing a part of the air conditioner. The intake system may include a connecting passage that guides first air to be cooled by passing through the first heat exchanger to the intake passage from the first division passage, and an air passage selector valve that switches a flow direction of the first air flows to the air passage or the intake passage. The controller may determine a necessity of the intake air cooling based on the operating state of the engine. When it determines that the intake air cooling is necessary, the controller may control the air passage selector valve so that the first air flows into the intake passage through the connecting passage, and when it determines that the intake air cooling is not necessary, the controller may control the air passage selector valve so that the first air flows into the first division passage.

According to this configuration, the heat exchanger of the evaporator of the air conditioner is divided into two, and if there is a cooling demand for the intake air, the intake air is cooled by the first heat exchanger. Therefore, it is not necessary to additionally provide a heat exchanger and a cooling channel dedicated for the intake air cooling. The intake air can be cooled with an inexpensive and simple structure.

Further, generally, immediately after a startup of the engine, the cooling demand for the air inside the cabin is high and the cooling load of the evaporator is large, whereas after a warm-up of the engine, the cooling load of the evaporator becomes smaller, and therefore, the evaporator has power remaining. On the other hand, the cooling demand for the intake air becomes high and the improvement effect of thermal efficiency also becomes high after the warm-up of the engine, not immediately after the startup of the engine.

Thus, the intake air can be cooled efficiently by utilizing the remaining power of the evaporator of the air conditioner. Both the cooling of intake air and the cooling of air inside the cabin can appropriately be achieved at low cost. Therefore, the thermal efficiency of the engine improves.

DETAILED DESCRIPTION OF THE DISCLOSURE

Hereinafter, one embodiment of the present disclosure is described with reference to the accompanying drawings. Note that the following description is merely illustration. Further, all directions of forward and rearward, leftward and rightward, and upward and downward, which are used in the following description, are based on a vehicle as illustrated in FIG. 2, unless otherwise particularly described.

Figure 1:
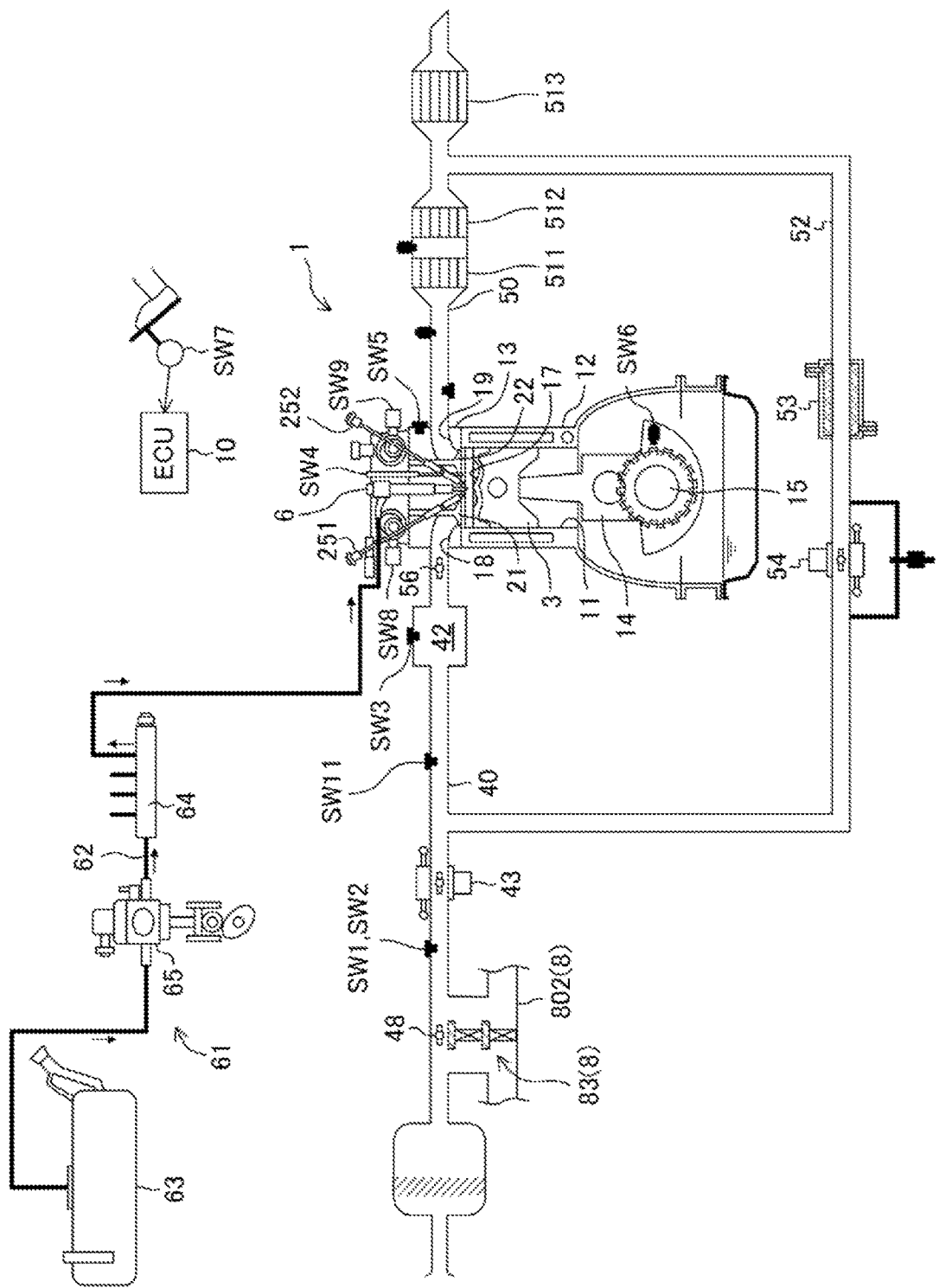
FIG. 1 is a view illustrating a configuration of an engine.
Figure 3:
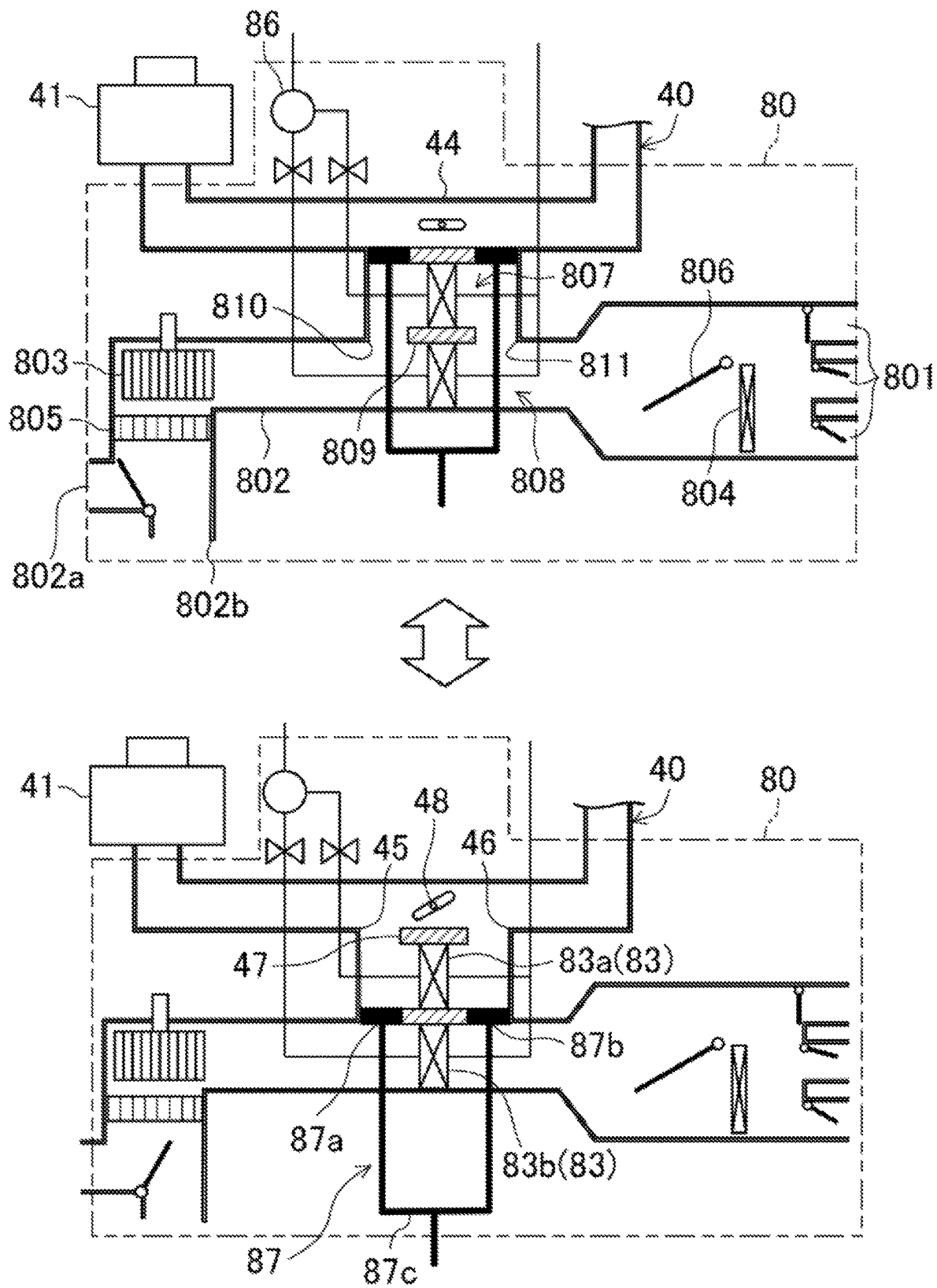
FIG. 3 is a view illustrating the detailed structure of an air conditioner body, where an upper figure illustrates a state where an air passage selector valve is located at a cabin cooling position, and a lower figure illustrates a state where the air passage selector valve is located at an intake air cooling position.
Figure 4:
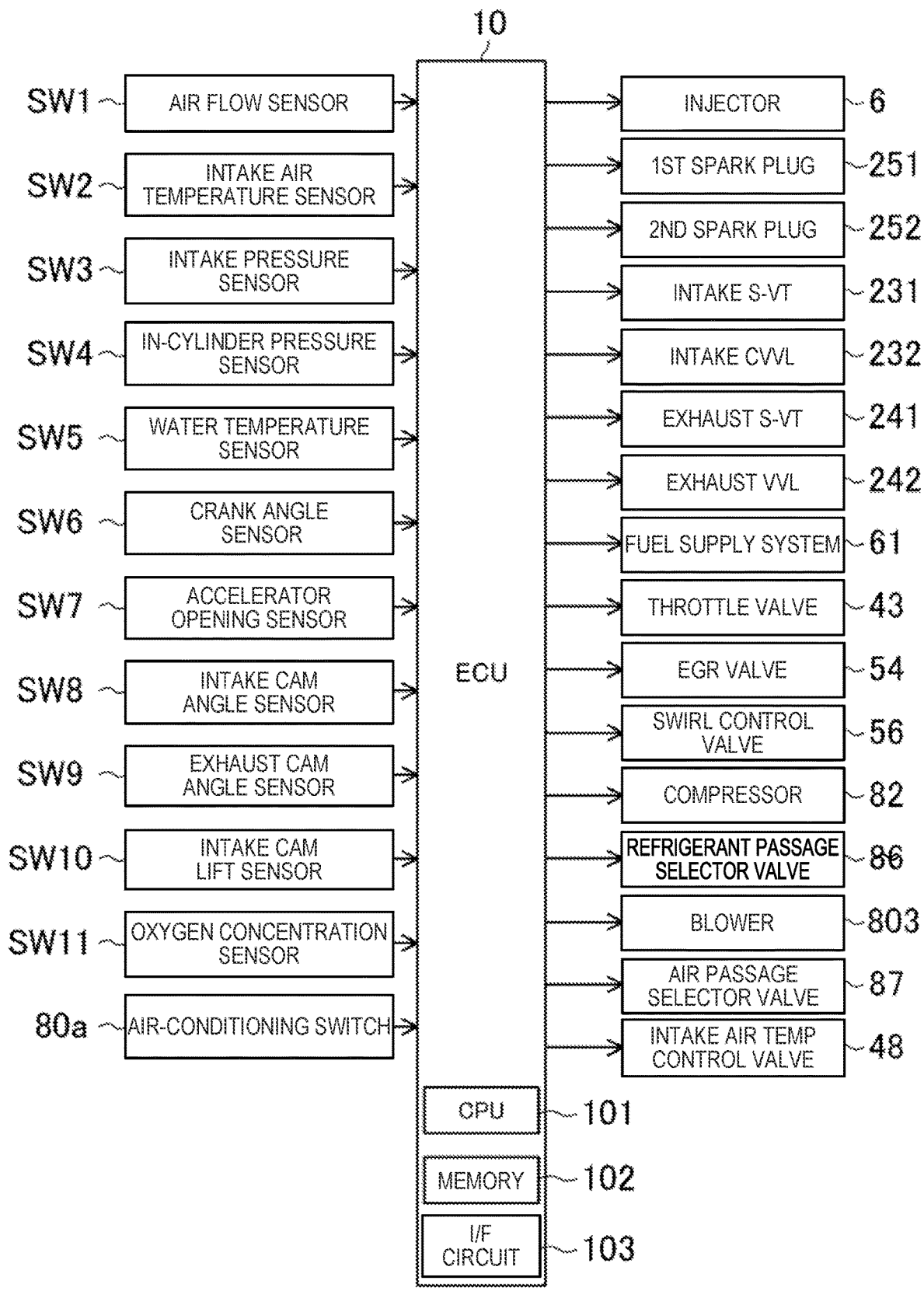
FIG. 4 is a block diagram illustrating a configuration of a control device for the engine.

FIG. 1 is a view illustrating a configuration of an engine. FIG. 2 is a view illustrating the engine and its intake system. FIG. 3 is a view illustrating the detailed structure of an air conditioner body, where an upper portion illustrates a state where an air passage selector valve is located at a cabin cooling position, and a lower portion illustrates a state where the air passage selector valve is located at an intake air cooling position. FIG. 4 is a block diagram illustrating a configuration of a control device for the engine.

(Structure Related to Mounting of Engine)

Figure 2:
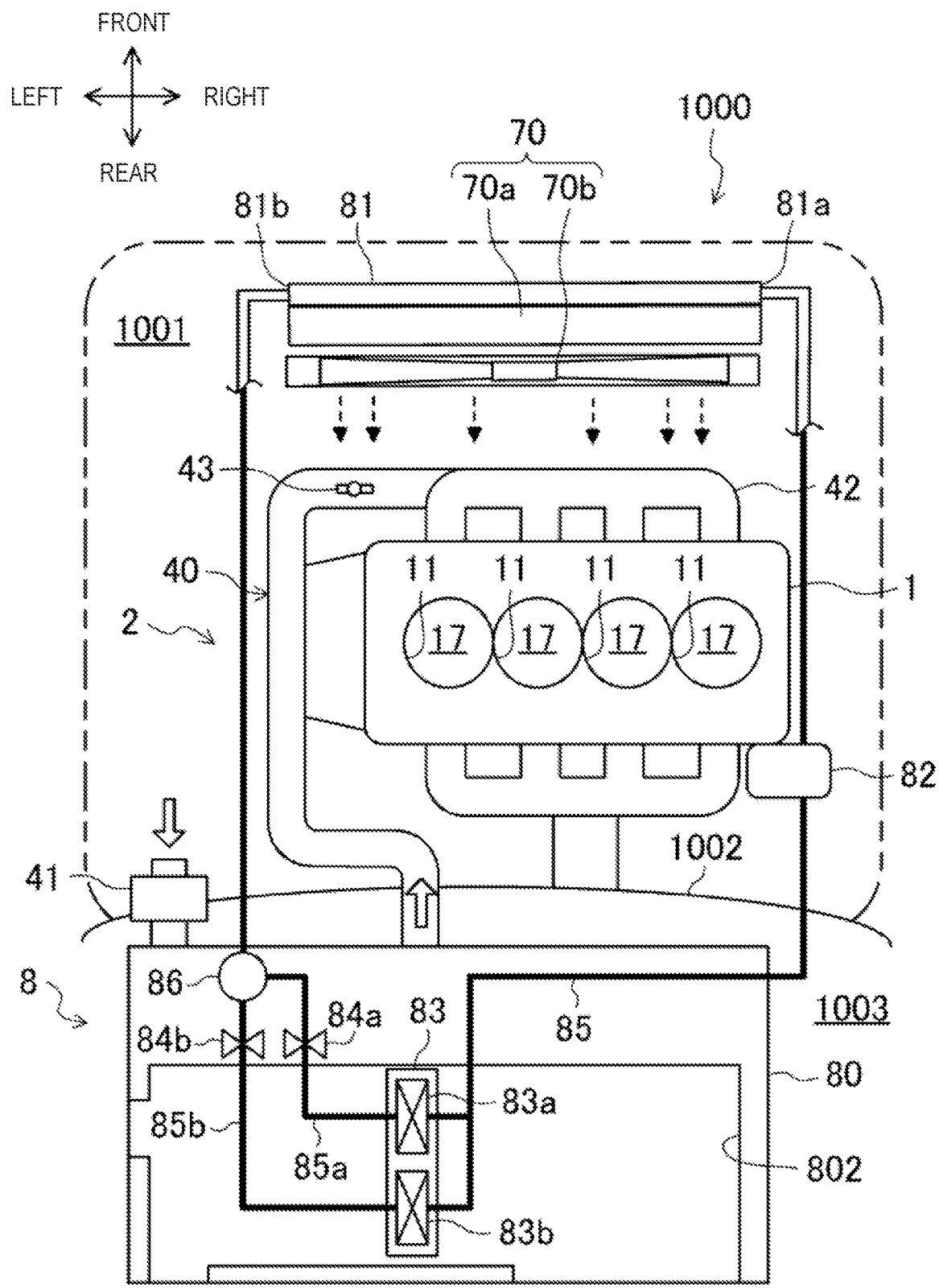
FIG. 2 is a view illustrating the engine and its intake system.

As illustrated in FIG. 2, an engine 1 and its intake system 2 are mounted on a four-wheel automobile (vehicle) 1000. In detail, an engine bay 1001 is provided to a front part of the automobile 1000, and the engine 1 is mounted in the engine bay 1001. The automobile 1000 travels when the engine 1 operates.

Here, a radiator unit 70 is installed on the front side of the engine bay 1001. This radiator unit 70 has a radiator 70a and a radiator fan 70b. The radiator unit 70 is disposed so as to be adjacent rearward of a front grille which takes external air into the engine bay 1001. The radiator 70a is comprised of plate-like members which are configured so that air passes therethrough in the thickness direction, and it is disposed so that one of the surfaces is oriented forward.

The radiator 70a cools coolant of the engine 1. That is, when hot coolant flows into the radiator 70a from the engine 1, the coolant is cooled by heat exchange with air, while passing through the radiator 70a. Then, the cooled, cold coolant is returned to the engine 1.

The radiator fan 70b is disposed behind and near the radiator 70a. The radiator fan 70b sends air so that air heated by passing through the radiator 70a flows rearward. By the radiator fan 70b operating, the heat exchange in the radiator 70a is stimulated.

Note that a condenser 81 of an air conditioner 8 is also disposed at the front side of the engine bay 1001, which will be described later.

(Overall Configuration of Engine)

The engine 1 is installed behind the radiator unit 70 in the engine bay 1001. This engine 1 has a cylinder 11. In the cylinder 11, an intake stroke, a compression stroke, an expansion stroke, and an exhaust stroke are repeated. The engine 1 is a four-stroke engine. Fuel of the engine 1 is gasoline in this example configuration.

The engine 1 includes a cylinder block 12 and a cylinder head 13. The cylinder head 13 is placed on the cylinder block 12. A plurality of the cylinders 11 are formed inside the cylinder block 12. The engine 1 is a multi-cylinder engine. In FIG. 1, only one cylinder 11 is illustrated. Note that in each of the cylinder block 12 and the cylinder head 13, a coolant passage (not illustrated) is formed in order to cool the engine 1. This coolant passage is a passage through which coolant cooled in the radiator 70a flows.

A piston 3 is inserted in each cylinder 11. The piston 3 is coupled to a crankshaft 15 via a connecting rod 14. The piston 3 reciprocates inside the cylinder 11. The cylinder 11 and the piston 3 inside the cylinder 11 form a combustion chamber 17.

Although not illustrated, a lower surface of the cylinder head 13 (i.e., a ceiling part of the cylinder 11) is a climbing slope toward a center part of the cylinder 11. The ceiling part of the cylinder 11 is of a so-called pentroof type. On the other hand, a cavity (not illustrated) is formed in an upper surface of the piston 3. This cavity is dented from the upper surface of the piston 3, and it has a so-called shallow dish shape.

The geometric compression ratio of the engine 1 is 15:1 or higher, and, for example, it is set to 30:1 or lower. As will be described later, according to this engine 1, a mixture gas carries out compression ignition combustion in a part of the operating range. The comparatively high geometric compression ratio stabilizes the compression ignition combustion.

An intake port 18 is formed inside the cylinder head 13 for every cylinder 11. The intake port 18 communicates with the inside of the cylinder 11. Although the detailed illustration is omitted, the intake port 18 is a so-called tumble port. That is, the intake port 18 has such a shape that a tumble flow occurs inside the cylinder 11. The pentroof-type ceiling part of the cylinder 11 and the tumble port cause the tumble flow to occur inside the cylinder 11.

An intake valve 21 is disposed at the intake port 18. The intake valve 21 opens and closes the intake port 18. A valve operating mechanism is connected to the intake valves 21. The valve operating mechanism opens and closes the intake valves 21 at a given timing. The valve operating mechanism is a variable valve operating device which varies a valve timing and/or a valve lift. As illustrated in FIG. 4, the valve operating mechanism includes an intake S-VT (Sequential-Valve Timing) 231. The intake S-VT 231 is of hydraulic or electric type. The intake S-VT 231 continuously changes a rotation phase of an intake cam shaft within a given angle range.

Further, the valve operating mechanism includes an intake CVVL (Continuously Variable Valve Lift) 232. The intake CVVL 232 can continuously change the lift of the intake valve 21 within a given range. The intake CVVL 232 can adopt known various configurations. As one example, as described in JP2007-085241A, the intake CVVL 232 can be configured to include a linkage mechanism, a control arm, and a stepping motor. The linkage mechanism is interlocked with rotation of the cam shaft so that it reciprocates cams for driving the intake valves 21. The control arm variably sets a lever ratio of the linkage mechanism. When the lever ratio of the linkage mechanism changes, a pivoting amount of the cam which depresses the intake valve 21 changes. The stepping motor changes the pivoting amount of the cam by electrically driving the control arm, thereby changing the lift of the intake valve 21.

An exhaust port 19 is formed inside the cylinder head 13 for every cylinder 11. The exhaust port 19 communicates with the inside of the cylinder 11.

The exhaust valve 22 is disposed at the exhaust port 19. The exhaust valve 22 opens and closes the exhaust port 19. The valve operating mechanism is connected to the exhaust valves 22. The valve operating mechanism opens and closes the exhaust valves 22 at a given timing. The valve operating mechanism is a variable valve operating device which varies a valve timing and/or a valve lift. As illustrated in FIG. 4, the valve operating mechanism includes an exhaust S-VT 241. The exhaust S-VT 241 is of a hydraulic or electric type. The exhaust S-VT 241 continuously changes a rotation phase of an exhaust cam shaft within a given angle range.

Figure 6:
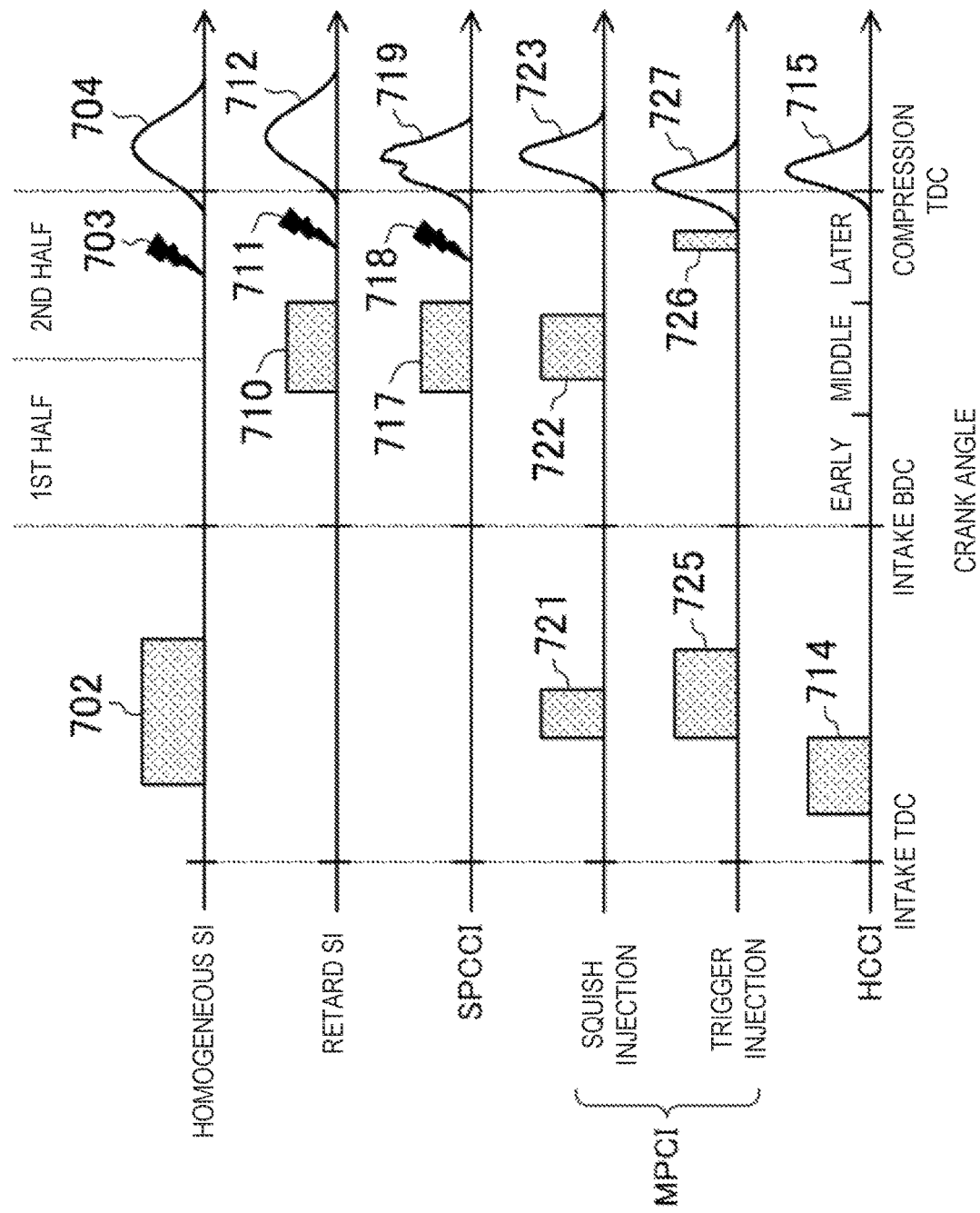
FIG. 6 is a view illustrating each combustion mode of the engine.

The valve operating mechanism also includes an exhaust VVL (Variable Valve Lift) 242. Although not illustrated, the exhaust VVL 242 is configured to be switchable of cams which open and close the exhaust valves 22. The exhaust VVL 242 may adopt known various configurations. As one example, as described in JP2018-168796A, the exhaust VVL 242 has a first cam, a second cam, and a switching mechanism which switches between the first cam and the second cam. The first cam is configured to open and close the exhaust valve 22 in exhaust stroke. As illustrated in FIG. 6 of JP2018-168796A, the second cam is configured to open and close the exhaust valve 22 in the exhaust stroke, and again open and close the exhaust valve 22 in intake stroke. The exhaust VVL 242 can change the lift of the exhaust valve 22 by opening and closing the exhaust valve 22 by one of the first cam and the second cam.

The intake S-VT 231, the intake CVVL 232, the exhaust S-VT 241, and the exhaust VVL 242 control opening and closing of the intake valve 21 and the exhaust valve 22 to adjust an introducing amount of air into the cylinder 11 and an introducing amount of burnt gas. The intake S-VT 231, the intake CVVL 232, the exhaust S-VT 241, and the exhaust VVL 242 adjust an intake air filling amount. The intake S-VT 231, the intake CVVL 232, the exhaust S-VT 241, and the exhaust VVL 242 can adjust the amount of intake supplied to the combustion chamber 17, and each constitute one of a plurality of intake air amount adjusters.

An injector 6 is attached to the cylinder head 13 for every cylinder 11. As illustrated in FIG. 1, the injector 6 is disposed in a center part of the cylinder 11. In more detail, the injector 6 is disposed in a valley part of the pentroof.

The injector 6 injects fuel directly into the cylinder 11. Although the detailed illustration is omitted, the injector 6 is of a multiple nozzle hole type having a plurality of nozzle holes. The injector 6 injects fuel so that fuel is spread radially from the center part of the cylinder 11 toward the periphery. The injector 6 can adjust the amount of fuel supplied to the combustion chamber 17 based on the load of the engine 1.

The injector 6 is connected to a fuel supply system 61. The fuel supply system 61 includes a fuel tank 63 which stores fuel, and a fuel supply line 62 which connects the fuel tank 63 to the injector 6. A fuel pump 65 and a common rail 64 are provided in the fuel supply line 62. The fuel pump 65 pumps fuel to the common rail 64. In this example configuration, the fuel pump 65 is a plunger-type pump which is driven by the crankshaft 15. The common rail 64 stores fuel fed from the fuel pump 65, at a high fuel pressure. When the injector 6 opens, fuel stored in the common rail 64 is injected into the cylinder 11 from the nozzle holes of the injector 6. The pressure of fuel supplied to the injector 6 may be changed according to the operating state of the engine 1. Note that the configuration of the fuel supply system 61 is not limited to the configuration described above.

A first spark plug 251 and a second spark plug 252 are attached to the cylinder head 13 for every cylinder 11. The first spark plug 251 and the second spark plug 252 each forcibly ignites the mixture gas inside the cylinder 11. Although the detail is omitted, the first spark plug 251 is disposed between the two intake valves 21, and the second spark plug 252 is disposed between the two exhaust valves 22. A tip end of the first spark plug 251 and a tip end of the second spark plug 252 are located near the ceiling part of the cylinder 11, on the intake side and the exhaust side of the injector 6, respectively. Note that the number of spark plugs may be one.

An intake passage 40 is connected to one of a plurality of side surfaces of the engine 1. The intake passage 40 is a passage which supplies intake air to the combustion chamber 17 as air by taking in the external air independently from the radiator unit 70. The intake passage 40 is disposed in the engine bay 1001. Note that in this engine 1, a part of the intake passage 40 enters into a cabin 1003 as will be described later.

In detail, the intake passage 40 communicates with the intake port 18 of each cylinder 11. Air to be introduced into the cylinder 11 flows into the intake passage 40. An air cleaner 41 is disposed in an upstream end part of the intake passage 40. The air cleaner 41 filters air. A surge tank 42 is disposed near a downstream end of the intake passage 40. The intake passage 40 downstream of the surge tank 42 constitutes independent passages branched for every cylinder 11. A downstream end of the independent passage is connected to the intake port 18 of each cylinder 11.

A throttle valve 43 is disposed in the intake passage 40, between the air cleaner 41 and the surge tank 42. The throttle valve 43 can adjust the introducing amount of air into the cylinder 11 by adjusting the valve opening. The throttle valve 43 is fundamentally fully opened during operation of the engine 1. The introducing amount of air is adjusted by the variable valve operating device described above. The throttle valve 43 can adjust the amount of intake air supplied to the combustion chamber 17, and constitutes one of the plurality of intake air amount adjusters.

The engine 1 has a swirl generating part which causes a swirl flow inside the cylinder 11. The swirl generating part has a swirl control valve 56 attached to the intake passage 40. Although the detailed illustration is omitted, among a primary passage and a secondary passage connected to each cylinder 11, the swirl control valve 56 is disposed in the secondary passage, downstream of the surge tank 42. The swirl control valve 56 is an opening adjusting valve which can choke the cross section of the secondary passage. When the opening of the swirl control valve 56 is small, since the flow rate of intake air which flows into the cylinder 11 from the primary passage is relatively large and the flow rate of intake air which flows into the cylinder 11 from the secondary passage is relatively small, the swirl flow inside the cylinder 11 becomes stronger. When the opening of the swirl control valve 56 is large, since the flow rates of intake air which flow into the cylinder 11 from the primary passage and the secondary passage become substantially equal to each other, the swirl flow inside the cylinder 11 becomes weaker. When the swirl control valve 56 is fully opened, the swirl flow will not occur.

An exhaust passage 50 is connected to the other side surface of the engine 1. The exhaust passage 50 communicates with the exhaust port 19 of each cylinder 11. The exhaust passage 50 is a passage through which exhaust gas discharged from the cylinder 11 flows. Although the detailed illustration is omitted, an upstream part of the exhaust passage 50 constitutes independent passages which branch for every cylinder 11. An upstream end of the independent passage is connected to the exhaust port 19 of each cylinder 11.

An exhaust emission control system having a plurality of catalytic converters is disposed in the exhaust passage 50. An upstream catalytic converter has, for example, a three-way catalyst 511 and a GPF (Gasoline Particulate Filter) 512. A downstream catalytic converter has a three-way catalyst 513. Note that the exhaust emission control system is not limited to the configuration of the illustrated example. For example, the GPF may be omitted. Further, the catalytic converter is not limited to what has the three-way catalyst. Further, the disposed order of the three-way catalyst and the GPF may be changed suitably.

An exhaust gas recirculation (EGR) passage 52 is connected between the intake passage 40 and the exhaust passage 50. The EGR passage 52 is a passage for recirculating a part of exhaust gas to the intake passage 40. An upstream end of the EGR passage 52 is connected between the upstream catalytic converter and the downstream catalytic converter in the exhaust passage 50. A downstream end of the EGR passage 52 is connected between the throttle valve 43 and the surge tank 42 in the intake passage 40.

A water-cooled EGR cooler 53 is disposed in the EGR passage 52. The EGR cooler 53 cools exhaust gas. An EGR valve 54 is also disposed in the EGR passage 52. The EGR valve 54 adjusts a flow rate of exhaust gas which flows through the EGR passage 52. By adjusting the opening of the EGR valve 54, a recirculating amount of the cooled exhaust gas can be adjusted.

(Cooling System of Engine)

The engine 1 according to this embodiment can cool the intake air itself by using a new cooling method utilizing the air conditioner 8 in addition to the normal cooling method using the coolant, etc. The utilization of the air conditioner 8 is advantageous in a reduction of the number of components, a reduction in manufacturing cost, and a simplification of the structure. The intake system 2 of this engine 1 can cool the intake air utilizing a part of the air conditioner 8.

In addition, by efficiently utilizing an evaporator 83 of the air conditioner 8, both the cooling of intake air and the cooling of the air inside the cabin 1003 can appropriately be achieved. That is, the present inventors noted that, as the usage of the evaporator of the air conditioner was taken into consideration, the evaporator of the air conditioner still has remaining power when the cooling demand for the intake air is high.

Generally, immediately after the engine begins, the cooling demand for the air inside the cabin is high, and the cooling load of the evaporator is large. On the other hand, after warm-up of the engine, the cooling load of the evaporator becomes smaller because the cabin is cooled, and therefore, the evaporator has remaining power. Here, the cooling of intake air is demanded after the engine warm-up. Therefore, without newly providing an evaporator in addition to the evaporator 83 of the air conditioner 8, this intake system 2 is configured so that the intake air is cooled using the remaining power of the evaporator 83.

(Air Conditioner)

As illustrated in FIG. 2, the cabin 1003 is provided rearward of the engine bay 1001 so as to be separated by a dash panel 1002. A body part of the air conditioner 8 (air conditioner body 80) which performs air-conditioning inside the cabin 1003 is installed forward of the cabin 1003 (the details of the air conditioner body 80 will be described later). The air-conditioner 8 is comprised of, in addition to the air conditioner body 80, the condenser 81, a compressor 82, the evaporator 83, expansion valves 84a and 84b, and a refrigerant passage 85. Among these, the evaporator 83 can cool air by heat exchange with refrigerant.

The refrigerant passage 85 can circulate the refrigerant through the compressor 82 and the evaporator 83. In detail, the refrigerant passage 85 is a passage through which the refrigerant circulates, and is comprised of piping, etc. The condenser 81, the compressor 82, the evaporator 83, and the expansion valves 84a and 84b are connected via the refrigerant passage 85. As starting from the compressor 82, the condenser 81, the expansion valves 84a and 84b, and the evaporator 83 are disposed from upstream toward downstream in the flow direction of the refrigerant.

This air conditioner 8 constitutes a part of the intake system 2 so that intake air can also be cooled. That is, the structure comprised of the expansion valves 84a and 84b, the evaporator 83, and the part of the refrigerant passage 85 of the air conditioner 8 is modified so that it can be shared with the intake system 2.

In detail, a heat exchanger of the evaporator 83 is divided into a first heat exchanger 83a and a second heat exchanger 83b which are independent from each other. In connection with it, a passage branched to two passages is provided to a part of the refrigerant passage 85 (a first branch passage 85a which supplies the refrigerant to the first heat exchanger 83a, and a second branch passage 85b which supplies the refrigerant to the second heat exchanger 83b).

A refrigerant passage selector valve 86 which switches flows of the refrigerant to the first heat exchanger 83a and the second heat exchanger 83b is provided to the branch part upstream of the refrigerant passage 85. The refrigerant passage selector valve 86 switches the passage so that the refrigerant flows into one or both of the first heat exchanger 83a and the second heat exchanger 83b. When the refrigerant flows into both the first heat exchanger 83a and the second heat exchanger 83b, the refrigerant passage selector valve 86 is also able to adjust a distribution ratio of the refrigerant by adjusting the opening.

Further, the first expansion valve 84a is installed in a part upstream of the first branch passage 85a, and the second expansion valve 84b is installed in a part upstream of the second branch passage 85b. Alternatively, the flow rates of the first expansion valve 84a and the second expansion valve 84b may be configured to be adjustable, and these valves may substitute the refrigerant passage selector valve 86. Note that although the air conditioner body 80 is also modified for sharing with the intake system 2, this will be described later.

The compressor 82 is of a mechanical type, and is attached to the engine 1. The compressor 82 is driven so as to be interlocked with the operation of the engine 1. By the compressor 82 being driven, it raises gaseous refrigerant at low temperature and low pressure to high temperature and high pressure and discharges the gaseous refrigerant. The compressor 82 is configured so that its output is changeable by controlling a clutch.

The compressor 82 may be of an electric type which can be independently driven from the engine 1. Further, the control method may be a rotation control method or a capacity control method. The mode of the compressor 82 may be changed suitably according to the demanded specification.

The condenser 81 is installed on the front side of the engine bay 1001. The condenser 81 is comprised of a plate-like member configured so that air can pass therethrough in the thickness direction, and it is disposed so that one of the surfaces is oriented forward. In this air conditioner 8, the condenser 81 is disposed so as to overlap with the front side of the radiator 70a. Note that the arrangement of the condenser 81 can be changed suitably according to the specification, such as rearward of the radiator 70a or side by side with the radiator 70a.

The condenser 81 has a refrigerant flow entrance 81a and a refrigerant flow exit 81b, and cools given refrigerant. That is, the gaseous refrigerant at high temperature and high pressure discharged from the compressor 82 flows into the condenser 81 from the refrigerant flow entrance 81a. Then, the gaseous refrigerant is cooled by heat exchange with air while passing through the condenser 81, and liquid refrigerant at low temperature and high pressure flows out of the refrigerant flow exit 81b.

The liquid refrigerant at low temperature and high pressure which flows out of the refrigerant flow exit 81b passes through the refrigerant passage selector valve 86, and flows into one or both of the first branch passage 85a and the second branch passage 85b. Then, by passing through one or both of the first expansion valve 84a and the second expansion valve 84b, the refrigerant reaches low temperature and low pressure. The refrigerant at low temperature and low pressure flows into the evaporator 83 (one or both of the first heat exchanger 83a and the second heat exchanger 83b).

While passing through the evaporator 83, the refrigerant absorbs heat by heat exchange with air, and evaporates. In connection with it, air which flows through an air passage 802 (described later) is cooled. The gaseous refrigerant at low temperature and low pressure which passed through the evaporator 83 flows into the compressor 82.

(Air Conditioner Body)

FIG. 3 illustrates the detailed structure of the air conditioner body 80. The air conditioner body 80 is disposed so as to face the inside of the cabin 1003. In a wall surface of the air conditioner body 80 which faces the cabin 1003, an air-conditioning switch 80a for operating the air conditioner 8 is installed (illustrated only in FIG. 4).

According to the operation of the air-conditioning switch 80a, the air conditioner body 80 blows off air of which the temperature is adjusted (cold air or warm air) from a blow-off opening (not illustrated) disposed at each place in the cabin 1003, including a defroster. The air conditioner body 80 is provided with, as a configuration which the air conditioner 8 originally has, the air passage 802, a blower 803, a heater 804, etc. in addition to the evaporator 83.

The air passage 802 is a duct-like passage formed inside the air conditioner body 80. The air passage 802 guides air into the cabin 1003 by a given flow. That is, two switchable intakes (an external intake 802a and an internal intake 802b) are formed in an upstream end part of the air passage 802. The external intake 802a introduces air outside the vehicle (external air), and the internal intake 802b introduces air inside the cabin 1003.

The blower 803 is installed in a part of the air passage 802 downstream of the intakes 802a and 802b via a filter 805. Air is forcibly introduced into the air passage 802 through the intakes 802a and 802b as the blower 803 being driven. On the other hand, a plurality of (in the illustrated example, three) derivation ports 801 are formed in a downstream end part of the air passage 802 so that the ports can be opened and closed according to operation of the air-conditioning switch 80a. These derivation ports 801 communicate with the blow-off opening described above.

The heater 804 and a shutter 806 are installed in a part of the air passage 802 upstream of these derivation ports 801. As the shutter 806 pivots, the air passage 802 switches between a heating passage which passes through the heater 804 and a bypass passage which bypasses the heater 804. By heating the heater 804 and controlling the shutter 806 so that air flows into the heating passage, air which blows off to the cabin 1003 can be heated.

The evaporator 83 is disposed at a part of the air passage 802 downstream of the blower 803 and upstream of the heater 804 and the shutter 806. Further, as illustrated in the upper figure of FIG. 3, the air passage 802 is divided into two in association with the division of the heat exchanger of the evaporator 83. Therefore, the air passage 802 is provided with a first division passage 807 and a second division passage 808.

In detail, a second partition part 809 is provided between the first heat exchanger 83a and the second heat exchanger 83b, and this second partition part 809 divides the air passage 802 into two, the first division passage 807 and the second division passage 808. Therefore, the first heat exchanger 83a is disposed at the first division passage 807, and the second heat exchanger 83b is disposed at the second division passage 808.

The second division passage 808 is provided so as to be continued from the air passage 802, and the first division passage 807 is provided so as to protrude to the side from the air passage 802 and become in parallel with the second division passage 808. An upstream communicating path 810 is provided upstream of the second partition part 809, and a downstream communicating path 811 is provided downstream of the second partition part 809. The second division passage 808 and the first division passage 807 communicate with each other via the upstream communicating path 810 and the downstream communicating path 811.

In order to cool the intake air, a part of the intake passage 40 downstream of the air cleaner 41 and upstream of the throttle valve 43 is incorporated into the air conditioner body 80. The intake passage 40 incorporated into the air conditioner body 80 is provided with a temperature adjustment passage 44 which is arranged in parallel and in contact with the first division passage 807. Further, as illustrated in the lower figure of FIG. 3, the temperature adjustment passage 44 communicates with the first division passage 807 via an upstream connecting passage 45 and a downstream connecting passage 46.

In detail, a first partition part 47 having the same structure as the second partition part 809 is disposed on the opposite side of the second heat exchanger 83b with respect to the first heat exchanger 83a, in parallel with the second partition part 809. This first partition part 47 partitions between the second division passage 808 and the temperature adjustment passage 44, where the upstream connecting passage 45 is provided upstream of the first partition part 47, and the downstream connecting passage 46 is provided downstream of the first partition part 47. The downstream connecting passage 46 can guide air (first air) cooled by passing through the first heat exchanger 83a, from the first division passage 807 to the intake passage 40.

An intake air temperature control valve 48 is installed in a part of the temperature adjustment passage 44 between the upstream connecting passage 45 and the downstream connecting passage 46. The intake air temperature control valve 48 adjusts its valve opening according to a control of a controller (described later) to change an amount of intake air which flows through the temperature adjustment passage 44.

Further, in order to close or open each of the upstream communicating path 810 and the downstream communicating path 811, and the upstream connecting passage 45 and the downstream connecting passage 46, an air passage selector valve 87 is provided to the air conditioner body 80. The air passage selector valve 87 has an upstream valve 87a which closes the upstream communicating path 810 or the upstream connecting passage 45, a downstream valve 87b which closes the downstream communicating path 811 or the downstream connecting passage 46, and a valve arm 87c which supports both the upstream valve 87a and the downstream valve 87b.

The air passage selector valve 87 displaces between a position illustrated in the upper figure of FIG. 3 (cabin cooling position) and a position illustrated in the lower figure of FIG. 3 (intake air cooling position) by the valve arm 87c being moved. When the position of the air passage selector valve 87 changes to the cabin cooling position or the intake air cooling position, the air cooled by passing through the first heat exchanger 83a (first air) is changed to either the air of the air conditioner 8 or the intake air. Further, the flow direction of the first air is changed toward the air passage 802 or the intake passage 40.

In detail, when the air passage selector valve 87 is located at the cabin cooling position, the upstream valve 87a and the downstream valve 87b close the upstream connecting passage 45 and the downstream connecting passage 46, and open the upstream communicating path 810 and the downstream communicating path 811. Therefore, a part of air of the air conditioner 8 which flows from upstream of the air passage 802 to the second division passage 808 flows into the first division passage 807 through the upstream communicating path 810, and passes through the first heat exchanger 83a. The air of the air conditioner 8 cooled by passing through the first heat exchanger 83a (first air) flows into the second division passage 808 through the downstream communicating path 811, flows downstream of the air passage 802, and is guided to the cabin 1003.

On the other hand, when the air passage selector valve 87 is located at the intake air cooling position, the upstream valve 87a and the downstream valve 87b open the upstream connecting passage 45 and the downstream connecting passage 46, and close the upstream communicating path 810 and the downstream communicating path 811. Therefore, all or part of the intake air which flows from upstream of the intake passage 40 to the temperature adjustment passage 44 flows into the first division passage 807 through the upstream connecting passage 45, and passes through the first heat exchanger 83a. The intake air cooled by passing through the first heat exchanger 83a (first air) flows into the temperature adjustment passage 44 through the downstream connecting passage 46, flows downstream of the intake passage 40, and is guided to the engine 1.

On the other hand, even if the air passage selector valve 87 is located at either the cabin cooling position or the intake air cooling position, air cooled by passing through the second heat exchanger 83b (second air) is only the air of the air conditioner 8. That is, the second heat exchanger 83b is used exclusively for the air conditioner.

The remainder of the air of the air conditioner 8 which flows from upstream of the air passage 802 to the second division passage 808 passes through the second heat exchanger 83b. The air of the air conditioner 8 cooled by passing through the second heat exchanger 83b (second air) flows succeedingly from the second division passage 808 to downstream of the air passage 802, and is guided to the cabin 1003.

(Control System of Engine)

As illustrated in FIG. 4, the control device of the engine 1 is provided with an ECU (Engine Control Unit) 10 for operating the engine 1. The ECU 10 is a controller based on a well-known microcomputer, and includes a CPU (Central Processing Unit) 101, memory 102, and an input and output (I/F) circuit 103. The CPU 101 executes a program. The memory 102 is comprised of, for example, RAM (Random Access Memory) and ROM (Read Only Memory), and stores the program and data. The I/F circuit 103 outputs and inputs an electric signal. The ECU 10 is one example of a controller in the present disclosure.

As illustrated in FIGS. 1 and 4, the ECU 10 is connected to various kinds of sensors SW1-SW11. The sensors SW1-SW11 each outputs a signal to the ECU 10.

For example, the sensors SW1-SW5 include an air flow sensor SW1 which is disposed in the intake passage 40, downstream of the air cleaner 41, and measures a flow rate of air which flows through the intake passage 40, an intake air temperature sensor SW2 which is disposed in the intake passage 40, downstream of the air cleaner 41, and measures a temperature of air which flows through the intake passage 40, an intake pressure sensor SW3 which is attached to the surge tank 42, and measures a pressure of air which is introduced into the cylinder 11, an in-cylinder pressure sensor SW4 which is attached to the cylinder head 13 corresponding to each cylinder 11, and measures a pressure inside of each cylinder 11, and a water temperature sensor SW5 which is attached to the engine 1, and measures a temperature of coolant.

Further, the sensors SW6-SW11 include a crank angle sensor SW6 which is attached to the engine 1, and measures a rotation angle of the crankshaft 15, an accelerator opening sensor SW7 which is attached to an accelerator pedal mechanism, and measures an accelerator opening corresponding to an operating amount of the accelerator pedal, an intake cam angle sensor SW8 which is attached to the engine 1, and measures a rotation angle of the intake cam shaft, an exhaust cam angle sensor SW9 which is attached to the engine 1, and measures a rotation angle of the exhaust cam shaft, an intake cam lift sensor SW10 which is attached to the engine 1, and measures a lift of the intake valve 21, and an oxygen concentration sensor SW11 which is attached to the engine 1, and measures an oxygen concentration of air which flows downstream of the intake air temperature control valve 48.

The ECU 10 determines the operating state of the engine 1 based on the detection signals of the sensors SW1-SW11. The ECU 10 calculates a controlled variable of each device according to the determined operating state and predefined control logic. The control logic is stored in the memory 102. The control logic includes calculating a targeted amount and/or controlled variable by using a map stored in the memory 102.

The ECU 10 outputs the electric signals according to the calculated controlled variables to the injector 6, the first spark plug 251, the second spark plug 252, the intake S-VT 231, the intake CVVL 232, the exhaust S-VT 241, the exhaust VVL 242, the fuel supply system 61, the throttle valve 43, the EGR valve 54, and the swirl control valve 56. By the ECU 10 inputting the electric signal into each actuator, the corresponding actuator is controlled. By the ECU 10 controlling each actuator, the engine 1 is operated.

Further, a control signal is inputted into the ECU 10 also from the air-conditioning switch 80a installed in the air conditioner body 60. The ECU 10 controls operation of each of the compressor 82, the refrigerant passage selector valve 86, the blower 803, the air passage selector valve 87, and the intake air temperature control valve 48 based on the inputted control signal. By the ECU 10 controlling these actuators, cooling of intake air (intake air cooling) by the air conditioner 8 is performed.

In detail, the ECU 10 as the controller determines the necessity of the intake air cooling based on the operating state of the engine 1. If the ECU 10 determines that the intake air cooling is necessary, it controls the air passage selector valve 87 so that the air cooled by passing through the first heat exchanger 83a (first air) flows into the intake passage 40 through the downstream connecting passage 46. On the other hand, if the ECU 10 determines that the intake air cooling is not necessary, it controls the air passage selector valve 87 so that the first air flows into the first division passage 807.

(Operation Control Map of Engine)

Figure 5:
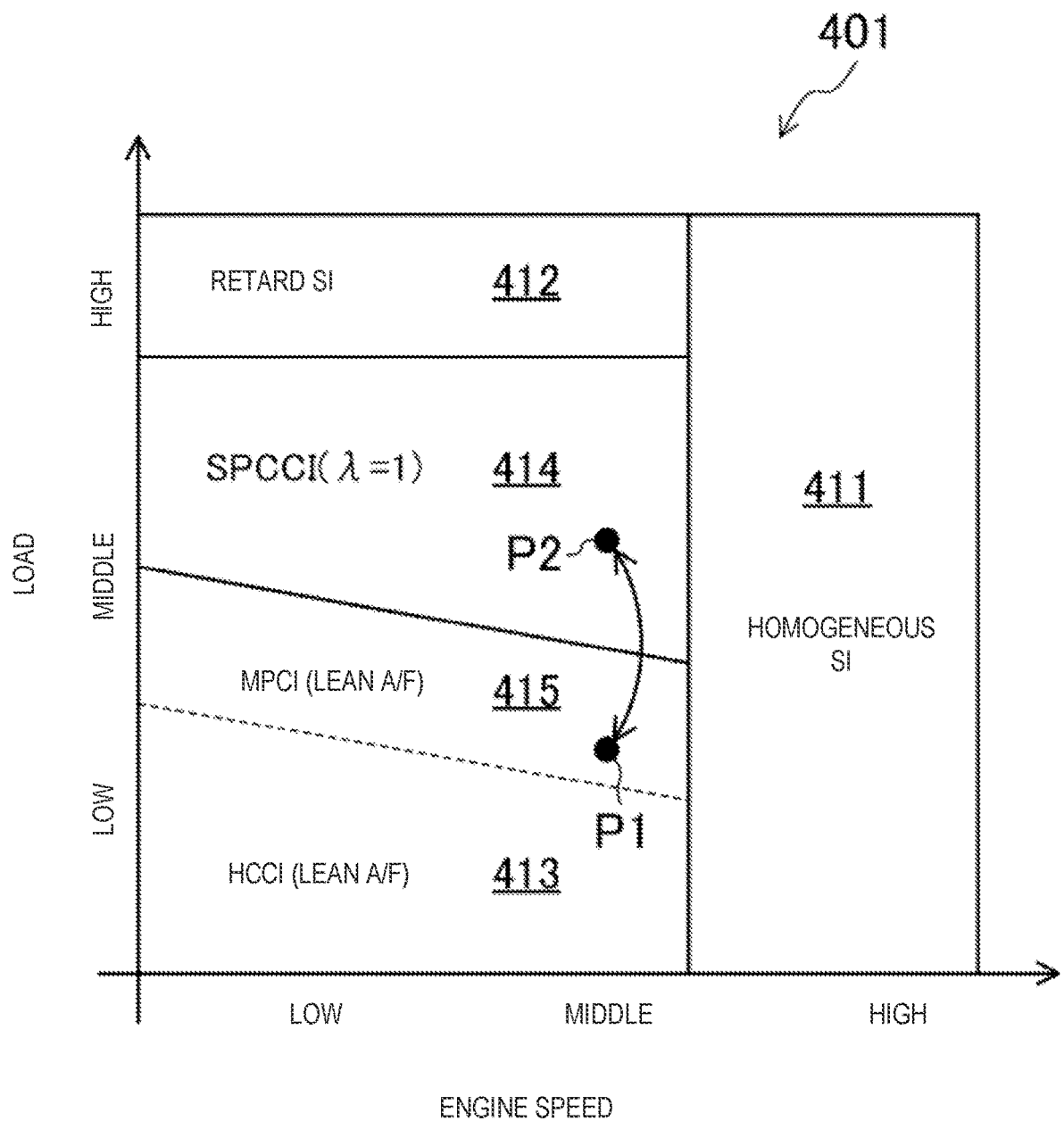
FIG. 5 is a view illustrating an operating range of the engine.

FIG. 5 illustrates a base map 401 according to the control of the engine 1. The base map 401 is stored in the memory 102 of the ECU 10. This base map 401 is a base map when the engine 1 is warm.

The base map 401 is defined by a load and an engine speed of the engine 1. The base map 401 is roughly divided into four ranges comprised of a first range, a second range, a third range, and a fourth range, according to the load and the engine speed. In more detail, the first range includes a high-speed range 411. The high-speed range 411 expands entirely from low load to high load. The second range corresponds to a high-load low-speed range 412. The third range corresponds to a low-load range 413 including idle operation, which expands to a low-speed range and a middle-speed range. The fourth range is middle-load ranges 414 and 415 where the load is higher than the low-load range 413 and lower than the high-load low-speed range 412.

The high-load low-speed range 412 includes the maximum load. The middle-load ranges 414 and 415 are classified into a first middle-load range 414, and a second middle-load range 415 where the load is lower than the first middle-load range 414.

Here, the low-speed range, the middle-speed range, and the high-speed range may be ranges, when the entire operating range of the engine 1 is divided into substantially equal three ranges comprised of a low-speed range, a middle-speed range, and a high-speed range in the engine speed direction, respectively.

In addition, the low-load range, the middle-load range, and the high-load range may be ranges, when the entire operating range of the engine 1 is divided into substantially equal three ranges comprised of a low-load range, a middle-load range, and a high-load range in the load direction, respectively.

(Combustion Mode of Engine)

Next, operation of the engine 1 in each range is described in detail. The ECU 10 changes the opening and closing of the intake valve 21 and the exhaust valve 22, the injection timing of fuel, and the existence of ignition, according to the load demanded to the engine 1, and the engine speed of the engine 1. By changing the intake air filling amount, the injection timing of fuel, and the existence of ignition, a combustion mode of the mixture gas inside the cylinder 11 changes. This combustion mode of the engine 1 changes between homogeneous Spark Ignition (SI) combustion, retard SI combustion, Homogeneous Charge Compression Ignition (HCCI) combustion, Spark Controlled Compression Ignition (SPCCI) combustion, and Multiple Premixed fuel injection Compression Ignition (MPCI) combustion. FIG. 6 illustrates the opening and closing of the intake valve 21 and the exhaust valve 22, the injection timing of fuel, and the ignition timing, versus a waveform of a heat release rate which is produced inside the cylinder 11 when mixture gas combusts, corresponding to each combustion mode. In FIG. 6, the crank angle advances from the left to the right. Below, each combustion mode is described in a case where the engine 1 is warm as one example.

(Homogeneous SI Combustion)

When the operating state of the engine 1 falls within the first range 411 (i.e., the high-speed range), the ECU 10 carries out flame propagation combustion of the mixture gas inside the cylinder 11. In this case, the ECU 10 sets the throttle valve 43 to a given first opening. The first opening may vary according to the load. Further, by the ECU 10 controlling the intake S-VT 231, the intake CVVL 232, the exhaust S-VT 241, and the exhaust VVL 242, the opening-and-closing mode of the intake valve 21 and the exhaust valve 22 is set to a given first mode. By these settings, a comparatively large amount of air and a comparatively small amount of burnt gas are introduced into the cylinder 11. The burnt gas is fundamentally internal EGR gas which remains inside the cylinder 11.

The injector 6 injects fuel into the cylinder 11 during the period of intake stroke (see the reference character "702"). The injection amount of fuel varies according to the load. Inside the cylinder 11, the mixture gas with homogeneous fuel concentration is formed. Note that a mass ratio A/F of air to fuel inside the cylinder 11 is in agreement with the stoichiometric air-fuel ratio (i.e., λ=1).

The first spark plug 251 and the second spark plug 252 both ignite the mixture gas near a compression top dead center (see the reference character "703"). After the ignition of the first spark plug 251 and the second spark plug 252, the mixture gas carries out flame propagation combustion (see the reference character "704"). Since this combustion mode carries out the spark ignition combustion of a homogeneous mixture gas, it may be referred to as "homogeneous SI combustion."

(Retard SI Combustion)

When the operating state of the engine 1 falls within the second range 412 (i.e., the high-load low-speed range), the ECU 10 carries out flame propagation combustion of the mixture gas inside the cylinder 11. In this case, the ECU 10 sets the throttle valve 43 to a given second opening. The second opening may vary according to the load. Further, by the ECU 10 controlling the intake S-VT 231, the intake CVVL 232, the exhaust S-VT 241, and the exhaust VVL 242, the opening-and-closing mode of the intake valve 21 and the exhaust valve 22 is set to a given second mode. By these settings, a comparatively large amount of air and a comparatively small amount of burnt gas are introduced into the cylinder 11. The burnt gas is fundamentally internal EGR gas which remains inside the cylinder 11.

Since the high-load low-speed range 412 is a range where the load is high and the engine speed is low, abnormal combustion, such as pre-ignition or knock, may easily occur. The injector 6 injects fuel into the cylinder 11 during the period of compression stroke (see the reference character "710"). The injection amount of fuel varies according to the load.

The first spark plug 251 and the second spark plug 252 both ignite the mixture gas near a compression top dead center (see the reference character "711"). After the ignition of the first spark plug 251 and the second spark plug 252, the mixture gas carries out flame propagation combustion (see the reference character "712"). Since this combustion mode retards the injection timing, it may be referred to as "retard SI combustion."

(HCCI Combustion)

When the operating state of the engine 1 falls within the third range 413 (i.e., the low-load range), the ECU 10 carries out compression ignition combustion of the mixture gas inside the cylinder 11.

In more detail, when the operating state of the engine 1 falls within the low-load range 413, the ECU 10 sets the throttle valve 43 to a given third opening. The third opening may vary according to the load.

Further, by the ECU 10 controlling the intake S-VT 231, the intake CVVL 232, the exhaust S-VT 241, and the exhaust VVL 242, the opening-and-closing mode of the intake valve 21 and the exhaust valve 22 is set to a given third mode. For example, in the third mode, the exhaust valve 22 opens and closes in exhaust stroke, and opens and closes in intake stroke. The opening-and-closing timing of the intake valve 21 is retarded by the intake S-VT 231.

The injector 6 injects fuel into the cylinder 11 during the period of intake stroke (see the reference character "714"). The fuel is diffused by a strong intake air flow, and the homogeneous mixture gas is formed inside the cylinder 11. As illustrated in the illustrated example, the injector 6 may perform package or batch injection. Alternatively, the injector 6 may perform divided injection. The injection amount of fuel varies according to the load.

The ECU 10 controls the intake S-VT 231, the intake CVVL 232, the exhaust S-VT 241, the exhaust VVL 242, the throttle valve 43, and the injector 6 based on the engine operating state to set the mixture gas inside the cylinder 11 to a first air-fuel ratio leaner than the stoichiometric air-fuel ratio. The ECU 10 controls to perform the first combustion mode (lean mode) in which the mixture gas combusts at the first air-fuel ratio so that HCCI combustion is performed. The first air-fuel ratio is up to $\lambda=2$, as being expressed by the excess air ratio.

When the operating state of the engine 1 falls within the low-load range 413, neither the first spark plug 251 nor the second spark plug 252 perform ignition. The mixture gas inside the cylinder 11 carries out compression ignition near a compression top dead center (see the reference character "715"). Therefore, the compression ignition combustion (more accurately, HCCI combustion) is realized. Further, by introducing a large amount of internal EGR gas to raise the in-cylinder temperature, the stability of HCCI combustion increases and thermal efficiency of the engine 1 improves.

(SPCCI Combustion)

When the operating state of the engine 1 falls within the fourth range (in more detail, the first middle-load range 414), the ECU 10 carries out flame propagation combustion of part of the mixture gas inside the cylinder 11 and carries out compression ignition combustion of the remainder.

In more detail, when the operating state of the engine 1 falls within the first middle-load range 414, the ECU 10 sets the throttle valve 43 to a given fourth opening. The fourth opening may vary according to the load.

Further, by the ECU 10 controlling the intake S-VT 231, the intake CVVL 232, the exhaust S-VT 241, and the exhaust VVL 242, the opening-and-closing mode of the intake valve 21 and the exhaust valve 22 is set to a given fourth mode. For example, in the fourth mode, the exhaust VVL 242 makes the exhaust valve 22 open and close twice. Further, the close timing of the intake valve 21 is substantially the same as the close timing in the low-load range 413. The open timing of the intake valve 21 is advanced from the open timing in the low-load range 413. By these settings, the amount of air introduced into the cylinder 11 increases, and the introducing amount of the burnt gas decreases. A gas/fuel ratio (G/F) of the mixture gas is 35:1, for example.

The injector 6 injects fuel into the cylinder 11 during the period of compression stroke (see the reference character "717"). As illustrated in the illustrated example, the injector 6 may perform package or batch injection. The injection amount of fuel varies according to the load.

The ECU 10 controls the intake S-VT 231, the intake CVVL 232, the exhaust S-VT 241, the exhaust VVL 242, the throttle valve 43, and the injector 6 based on the engine operating state to set the mixture gas inside the cylinder 11 to a second air-fuel ratio which is substantially in agreement with the stoichiometric air-fuel ratio. The ECU 10 controls to perform the second combustion mode (stoichiometric mode) in which the mixture gas combusts at the second air-fuel ratio so that SPCCI combustion is performed. This second combustion mode is executable by controlling the first spark plug 251 and the second spark plug 252 at a given ignition timing. Note that the second air-fuel ratio is substantially in agreement with the stoichiometric air-fuel ratio. The second air-fuel ratio is equal to $\lambda=1$, as being expressed by the excess air ratio.

The first spark plug 251 and the second spark plug 252 both ignite the mixture gas near a compression top dead center (see the reference character "718"). Near the compression top dead center after the first spark plug 251 and the second spark plug 252 ignited, the mixture gas begins flame propagation combustion. Generation of heat by the flame propagation combustion raises the temperature inside the cylinder 11, and the flame propagation increases the pressure inside the cylinder 11. Thus, unburnt mixture gas carries out self-ignition, for example, after the compression top dead center, and then begins compression ignition combustion. After the compression ignition combustion begins, flame propagation combustion and compression ignition combustion progress in parallel. The waveform of the heat release rate may have two peaks as illustrated in FIG. 6 (see the reference character "719").

By adjusting the calorific value of the flame propagation combustion, the variation in the temperature inside the cylinder 11 before the compression begins can be absorbed. By the ECU 10 adjusting the ignition timing, the calorific value of the flame propagation combustion can be adjusted. The mixture gas comes to carry out self-ignition at a target timing. In SPCCI combustion, the ECU 10 adjusts the timing of the compression ignition through the adjustment of the ignition timing. Since this combustion mode controls the compression ignition by the spark ignition, it may be referred to as "SPCCI (Spark Controlled Compression Ignition) combustion."

(MPCI Combustion)

When the operating state of the engine 1 falls within the fourth range (in more detail, the second middle-load range 415), the ECU 10 carries out compression ignition combustion of the mixture gas inside the cylinder 11.

In more detail, when the operating state of the engine 1 falls within the second middle-load range 415, the ECU 10 sets the throttle valve 43 to a given fifth opening. The fifth opening varies according to the load.

Further, by the ECU 10 controlling the intake S-VT 231, the intake CVVL 232, the exhaust S-VT 241, and the exhaust VVL 242, the opening-and-closing mode of the intake valve 21 and the exhaust valve 22 is set to a given fifth mode. For example, in the fifth mode, the exhaust S-VT 241 sets the opening-and-closing timing of the exhaust valve 22 at a given timing. The exhaust VVL 242 opens and closes the exhaust valve 22 twice. The intake CVVL 232 sets the lift of the intake valve 21 smaller than the lift in the first middle-load range 414. The close timing of the intake valve 21 is substantially the same as the close timing of the first middle-load range 414. The open timing of the intake valve 21 is retarded from the open timing in the first middle-load range 414 (not illustrated). By this opening-and-closing mode of the intake valve 21 and the exhaust valve 22, the amount of air introduced into the cylinder 11 decreases, and the introducing amount of the burnt gas increases.

The injector 6 injects fuel into the cylinder 11 each of during the period of compression stroke and during the period of intake stroke. That is, the injector 6 performs the divided injection. In the second middle-load range 415, the ECU 10 selectively uses two injection modes comprised of squish injection and trigger injection. The squish injection is an injection mode in which the injector 6 injects fuel during the period of intake stroke and during the middle period of compression stroke (see the reference characters "721" and "722"). The trigger injection is an injection mode in which the injector 6 injects fuel during the period of intake stroke and during the later period of compression stroke (see the reference characters "725" and "726"). The injection amount of fuel varies according to the load.

The ECU 10 controls the intake S-VT 231, the intake CVVL 232, the exhaust S-VT 241, the exhaust VVL 242, the throttle valve 43, and the injector 6 based on the engine operating state to set the mixture gas inside the cylinder 11 to the first air-fuel ratio leaner than the stoichiometric air-fuel ratio. The ECU 10 controls to perform the first combustion mode (lean mode) in which the mixture gas combusts at the first air-fuel ratio so that MPCI combustion is performed. This first combustion mode is executable by controlling the first spark plug 251 and the second spark plug 252 at a given ignition timing. Note that the first air-fuel ratio is up to $\lambda=2$, as being expressed by the excess air ratio.

The term "first air-fuel ratio" as used herein is merely a general term of a value leaner than the stoichiometric air-fuel ratio. That is, it is not necessary to make the air-fuel ratio in HCCI combustion coincide with the air-fuel ratio in MPCI combustion.

The squish injection is an injection mode which makes compression ignition combustion slower. The fuel injected by the squish injection during the period of intake stroke is diffused inside the cylinder 11 by a strong intake air flow. Therefore, the homogeneous mixture gas is formed inside the cylinder 11. The fuel injected during the middle period of compression stroke locally reduces the temperature inside the cylinder 11, and also makes the mixture gas heterogeneous inside the cylinder 11. As a result, for example, when the in-cylinder temperature is high, the mixture gas carries out compression ignition at a desired timing, while suppressing the occurrence of abnormal combustion (see the reference character "723"). The squish injection enables comparatively slow compression ignition combustion.

The rectangles in FIG. 5 are injection periods of the injector 6, and the rectangular area corresponds to the injection amount of fuel. In the squish injection, the injection amount of fuel in compression stroke is larger than the injection amount of fuel in intake stroke. Since fuel is injected to a wide area outside the cavity, generation of smoke can be suppressed, even if the amount of fuel is large. The temperature decreases as the amount of fuel increases. The injection amount of fuel in compression stroke may be set to an amount which can realize the demanded temperature decrease.

The trigger injection is an injection mode which stimulates the compression ignition combustion. Fuel injected during the period of intake stroke is diffused inside the cylinder 11 by a strong intake air flow. Therefore, the homogeneous mixture gas is formed inside the cylinder 11. Fuel injected during the later period of compression stroke stays in an area where the temperature is high and which is separated from the cylinder liner. Since the mixture gas lump with rich fuel is formed in the area where the temperature is high, the compression ignition of the mixture gas is stimulated. As a result, for example, when the G/F of the mixture gas is large, the mixture gas promptly carries out compression ignition after the compression stroke injection, and therefore, the compression ignition combustion is stimulated (see the reference character "727"). The trigger injection improves combustion stability.

In the trigger injection, the injection amount of fuel in compression stroke is less than the injection amount of fuel in intake stroke. As described above, since the injection of fuel in compression stroke is performed during the later period of compression stroke, the injected fuel stays inside the cavity and is difficult to be diffused. By reducing the fuel amount, the generation of smoke can be suppressed. The injection amount of fuel in compression stroke may be set to an amount which achieves both the demanded stimulating effect of compression ignition, and the suppression of the generation of smoke.

Both the squish injection and the trigger injection make the mixture gas inside the cylinder 11 heterogeneous. In this regard, it differs from HCCI combustion in which the homogeneous mixture gas is formed. Both the squish injection and the trigger injection can control the timing of compression ignition by forming the heterogeneous mixture gas.

Since in this combustion mode the injector performs a plurality of fuel injections, this combustion mode may be referred to as "MPCI (Multiple Premixed fuel injection Compression Ignition) combustion."

(Details of Engine Control According to Engine Load)

Here, in the timing chart of each combustion mode illustrated in FIG. 6, lower combustion modes in this drawing are combustion modes with a low load of the engine 1, and upper combustion modes in this drawing are combustion modes with a high engine load.

This engine 1 can promptly change the G/F of the mixture gas according to the change in the engine load to seamlessly switch the combustion mode between SI combustion, HCCI combustion, MPCI combustion, and SPCCI combustion. For example, the ECU 10 according to this embodiment can switch, based on the operating state of the engine 1, between the first combustion mode in which MPCI combustion is performed and the second combustion mode in which SPCCI combustion is performed by controlling the throttle valve 43 and the injector 6.

As illustrated in FIG. 6, the operating range where the first combustion mode is performed (the second middle-load range 415 in FIG. 5), and the operating range where the second combustion mode is performed (the first middle-load range 414 in FIG. 5) are adjacent to each other in the load direction. When switching between the first combustion mode in which the air-fuel ratio is lean and the second combustion mode in which the air-fuel ratio is at the stoichiometric air-fuel ratio, the air-fuel ratio goes via a so-called intermediate A/F ($1<\lambda<2$) during the transition between these modes. At this intermediate A/F, since $NO_x$ cannot be removed by the three-way catalyst 511, it is inconvenient for reducing the $NO_x$ emission.

On the other hand, the generating amount of $NO_x$ generally depends on the in-cylinder temperature. For example, since it becomes difficult to bond nitrogen and oxygen when the in-cylinder temperature is low, it becomes possible to suppress the generation of $NO_x$ as compared with the case where the in-cylinder temperature is high.

Thus, the present inventors considered to perform intake air cooling when transitioning between the modes in order to reduce the in-cylinder temperature. Particularly, the engine 1 according to this embodiment can perform the intake air cooling using the air conditioner 8 described above.

In detail, the ECU 10 controls an intake air cooler (for example, the air conditioner 8) to start the cooling of intake air, in response to a request for switching between the first combustion mode and the second combustion mode (first step).

After the intake air cooler begins the cooling of intake air, the ECU 10 controls the intake air amount adjuster (for example, the throttle valve 43) to start switching between the first combustion mode and the second combustion mode (second step). Thus, switching between the first air-fuel ratio and the second air-fuel ratio begins. Before or after the changing of the air-fuel ratio, the ECU 10 ends the cooling of intake air by the intake air cooler. For example, the ECU 10 ends the intake air cooling by the intake air cooler, during the changing of the air-fuel ratio (third step).

Then, the ECU 10 controls the intake air cooler and the intake air amount adjuster so that switching between the first combustion mode and the second combustion mode is finished at a timing after the cooling of intake air by the intake air cooler is finished (fourth step).

That is, the ECU 10 according to this embodiment controls the intake air cooler and the intake air amount adjuster based on the operating state of the engine 1 to start the intake air cooling at the timing earlier than the changing of the air-fuel ratio, and to finish the changing of the air-fuel ratio after the intake air cooling is finished.

Below, a control process for the intake air cooling is described in detail based on the illustrated example.
(Control Process for Intake Air Cooling)

Figure 7:
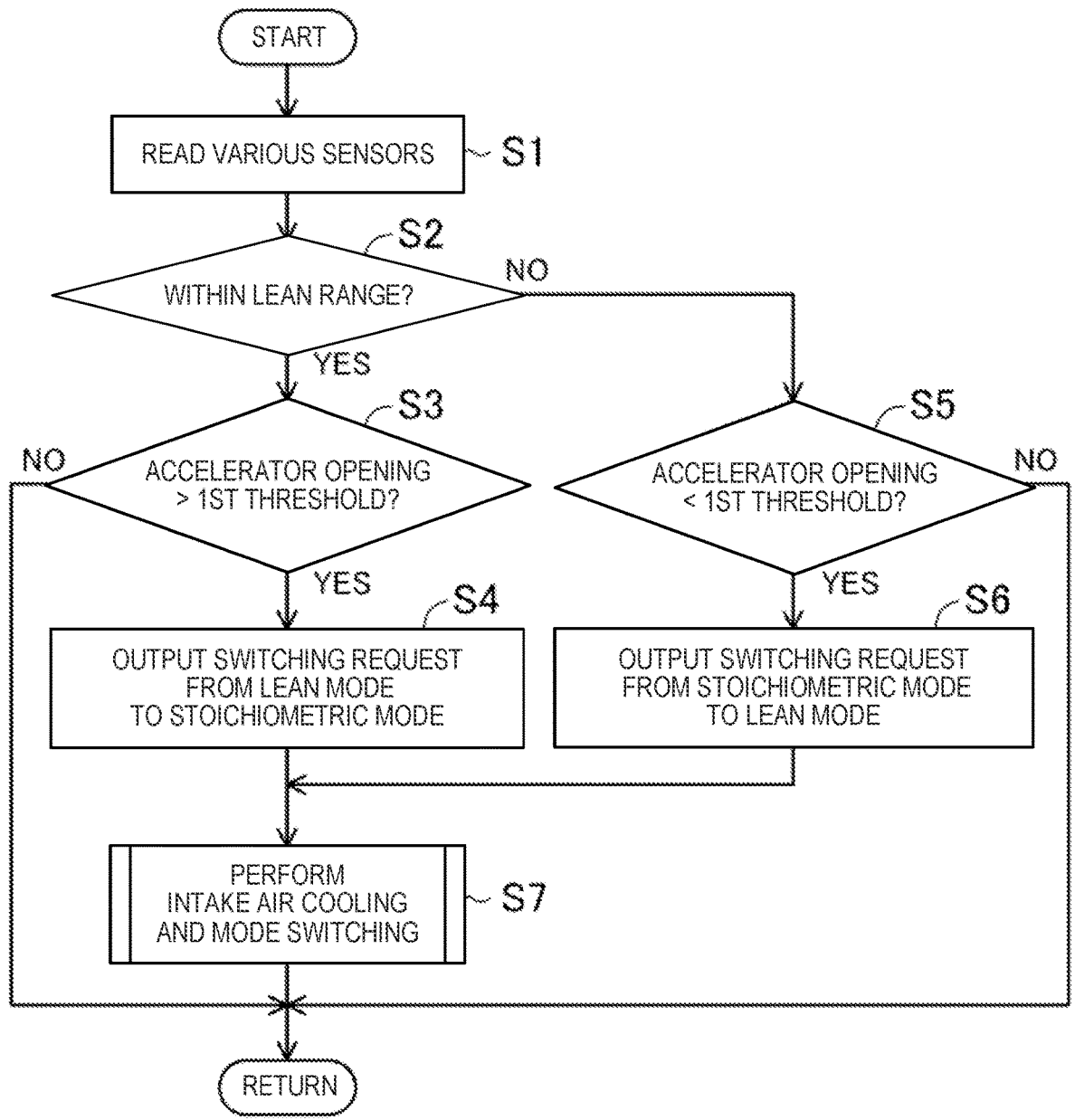
FIG. 7 is a flowchart illustrating a control process of the engine.
Figure 8:
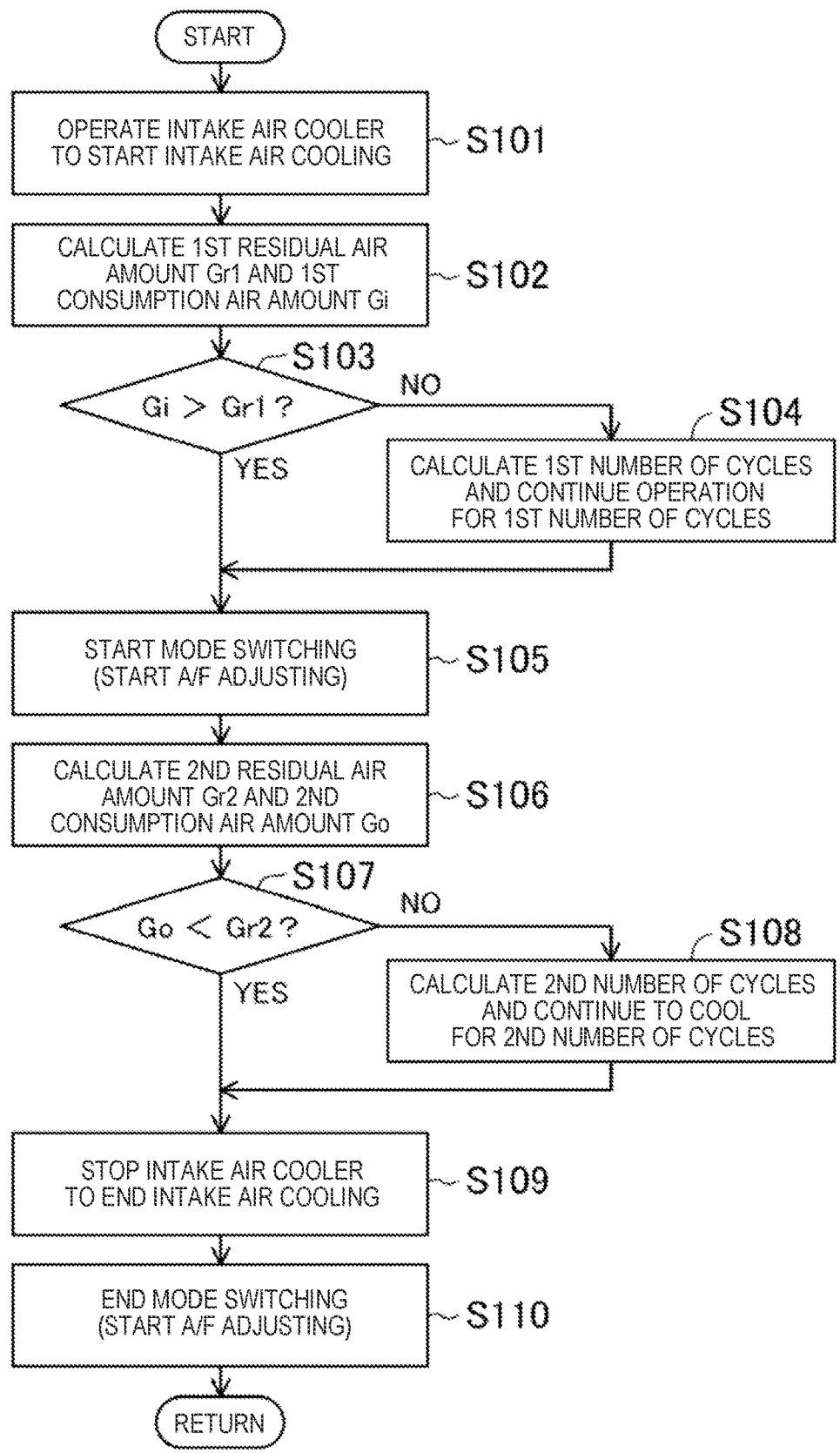
FIG. 8 is a flowchart illustrating the control process of the engine.

FIGS. 7 and 8 are flowcharts illustrating a control process of the engine 1. First, the ECU 10 reads the detection signals of the various sensors (for example, the sensors SW1-SW11) at Step S1 in FIG. 7.

At subsequent Step S2, the ECU 10 determines the operating state of the engine 1 based on the detection signals read at Step S1. The ECU 10 determines whether the present operating state falls within the operating range corresponding to the first combustion mode (lean range) based on the determined operating state. For example, the ECU 10 determines whether the current load falls within the second middle-load range 415 like an operating point P1 in FIG. 5. If this determination is YES, the ECU 10 shifts the control process to Step S3. If this determination is NO, the ECU 10 shifts the control process to Step S5.

At Step S3, the ECU 10 determines whether the accelerator opening is more than a first threshold. This determination serves as the determination of whether the engine 1 is accelerating, and if the engine 1 is accelerating, the determination of the target load of the engine 1 at the timing of Step S3. The latter determination is performed by determining whether the current target load falls within the operating range corresponding to the second combustion mode (stoichiometric range). For example, the ECU 10 determines whether the target load of the engine 1 falls within the first middle-load range 414 like an operating point P2 in FIG. 5. If this determination is YES, the ECU 10 shifts the control process to Step S4 where it switches the combustion mode from the first combustion mode (lean mode) to the second combustion mode (stoichiometric mode). On the other hand, if the determination at Step S3 is NO, the ECU 10 ends the flow illustrated in FIG. 7 in order to continue the operation in the lean mode.

At Step S4, the ECU 10 generates a control signal corresponding to the switching request from the first combustion mode (lean mode) to the second combustion mode (stoichiometric mode), and outputs it to the air conditioner 8 as the intake air cooler, and the throttle valve 43 as the intake air amount adjuster.

At Step S5, the ECU 10 determines whether the accelerator opening is less than the first threshold. This determination serves as the determination of whether the engine 1 is decelerating, and if the engine 1 is decelerating, the determination of the target load of the engine 1 at the timing of Step S5. The latter determination is performed by determining whether the current target load falls within the operating range corresponding to the first combustion mode (lean range). For example, the ECU 10 determines whether the target load of the engine 1 falls within the second middle-load range 415 like the operating point P1 in FIG. 5. If this determination is YES, the ECU 10 shifts the control process to Step S6 where it switches the combustion mode from the second combustion mode (stoichiometric mode) to the first combustion mode (lean mode). On the other hand, if the determination at Step S5 is NO, the ECU 10 ends the flow illustrated in FIG. 7 in order to continue the operation in the stoichiometric mode.

At Step S6, the ECU 10 generates the control signal corresponding to the switching request from the second combustion mode (stoichiometric mode) to the first combustion mode (lean mode), and outputs it to the air conditioner 8 as the intake air cooler, and the throttle valve 43 as the intake air amount adjuster.

At Step S7 which continues from Steps S4 and S6, the ECU 10 carries out processings corresponding to Steps S1-S4. The details of Step S7 are as illustrated in the flow of FIG. 8.

In detail, at Step S101 of FIG. 8, the ECU 10 operates the air conditioner 8 as the intake air cooler to begin the intake air cooling. Step S101 is illustration of the first step.

In more detail, the ECU 10 switches the air passage selector valve 87 to the intake air cooling position illustrated in the lower figure of FIG. 3, while at least the blower 803 is driven. Therefore, the first air cooled by the first heat exchanger 83*a* of the evaporator 83 flows into the intake passage 40 from the downstream connecting passage 46. In that case, the ECU 10 controls the outputs of the radiator fan 70*b* and the blower 803 to adjust the intake air temperature of the first air which flows into the intake passage 40, and controls the valve opening of an intake air temperature adjusting valve 88 to adjust the amount of first air.

At subsequent Step S102, after starting the intake air cooling by the intake air cooler, the ECU 10 calculates a first residual air amount Gr1 of air which remains inside the intake passage 40 downstream of the intake air cooler, and a first consumption air amount Gi of air which is consumed by the time the transition between the first combustion mode and the second combustion mode begins, based on the operating state of the engine 1.

In detail, the ECU 10 calculates the amount of air which remains inside the intake passage 40 downstream of the first heat exchanger 83*a* and the intake air temperature adjusting valve 88 based on the intake pressure measured by the intake pressure sensor SW3, the intake air temperature measured by the intake air temperature sensor SW2, and the oxygen concentration measured by the oxygen concentration sensor SW11. This calculated value is stored in the memory 102, etc. as the first residual air amount Gr1.

The ECU 10 determines, for every cylinder 11, operating points which are waypoints from the first combustion mode or the second combustion mode to a transition mode described later (for example, a plurality of operating points set between P1 and P2 in FIG. 5), and calculates the amount of air consumed at each determined operating point. Then, the ECU 10 calculates an integrated value of each calculated air amount. This integrated value is stored in the memory 102, etc. as the first consumption air amount Gi. The first consumption air amount Gi indicates the total amount of intake air which is sent into the combustion chamber 17 and is consumed by the time it crosses the boundary between the lean range and the stoichiometric range.

At the subsequent Step S103, the ECU 10 determines whether the first consumption air amount Gi is larger than the first residual air amount Gr1. If this determination is YES, the ECU 10 shifts the control process to Step S105. On the other hand, if this determination is NO, the ECU 10 shifts the control process to Step S104.

If the determination at Step S103 is NO (i.e., if the first consumption air amount Gi is less than the first residual air amount Gr1 and it shifts to Step S104), the ECU 10 starts the switching between the first combustion mode and the second combustion mode, in response a determination that the number of cycles which passed after the calculation of the first consumption air amount Gi and the first residual air amount Gr1 exceeds a given first number of cycles.

In detail, the ECU 10 calculates the first consumption air amount Gi based on the load of the engine 1 and the engine speed at the timing of Step S104, and calculates the first number of cycles based on this first consumption air amount Gi. For example, if the first consumption air amount Gi is large, the ECU 10 sets the first number of cycles less as compared with the case where the first consumption air amount Gi is small. That is, the ECU 10 sets the first number of cycles so that it has a negative correlation with the first consumption air amount Gi.

Then, the ECU 10 counts the number of cycles having passed after calculating the first consumption air amount Gi and the first residual air amount Gr1, and until the counted number of cycles reaches the first number of cycles, it continues the operation in the combustion mode which is the same mode as before the switching. For example, if it is the transition from the first combustion mode to the second combustion mode, the ECU 10 continues the operation in the first combustion mode only for the first number of cycles. When the counted number of cycles reaches the first number of cycles, the ECU 10 transitions the control process to Step S105.

On the other hand, if the determination at Step S103 is YES (i.e., if the first consumption air amount Gi is larger than the first residual air amount Gr1), the ECU 10 starts the switching between the first combustion mode and the second combustion mode, regardless of the number of cycles of the engine 1. In this case, the ECU 10 shifts the control process to Step S105, without performing Step S104.

At Step S105, the ECU 10 controls the throttle valve 43, the intake S-VT 231, and the exhaust S-VT 241 as the intake air amount adjuster to begin the switching between the first combustion mode and the second combustion mode. Step S105 is illustration of the second step.

The ECU 10 according to this embodiment is switchable to the transition mode in which the intake air amount adjuster is controlled to transition the air-fuel ratio inside the combustion chamber 17 between the first air-fuel ratio and the second air-fuel ratio, while maintaining the load of the engine 1 substantially constant, as the operation mode for switching the air-fuel ratio. The ECU 10 is configured to perform the switching between the first combustion mode and the second combustion mode by the intake air amount adjuster, via this transition mode. Note that when switching the combustion mode accompanied by jump spark ignition like SPCCI combustion, jump spark ignition may be performed during the transition mode, or the jump spark ignition may not be performed like MPCI combustion and HCCI combustion.

That is, in this embodiment, when switching from the first air-fuel ratio to the second air-fuel ratio, the ECU 10 temporarily switches from the first combustion mode to the transition mode, and after adjusting the air-fuel ratio in the transition mode, switches from the transition mode to the second combustion mode. Similarly, when switching from the second air-fuel ratio to the first air-fuel ratio, the ECU 10 according to this embodiment temporarily switches from the second combustion mode to the transition mode, and after adjusting the air-fuel ratio in the transition mode, switches from the transition mode to the first combustion mode.

At the subsequent Step S106, after starting the switching between the first combustion mode and the second combustion mode, the ECU 10 calculates a second residual air amount Gr2 of air which remains inside the intake passage 40 downstream of the intake air cooler, and a second air consumption amount Go of air which is consumed by the time the switching between the first combustion mode and the second combustion mode is finished, based on the operating state of the engine 1.

In detail, the ECU 10 calculates the amount of air which remains inside the intake passage 40 downstream of the first heat exchanger 83a and the intake air temperature adjusting valve 88 based on the intake pressure measured by the intake pressure sensor SW3, the intake air temperature measured by the intake air temperature sensor SW2, and the oxygen concentration measured by the oxygen concentration sensor SW11. This calculated value is stored in the memory 102, etc. as the second residual air amount Gr2.

Further, the ECU 10 determines, for every cylinder 11, the operating points which are waypoints from the transition mode to the first combustion mode or the second combustion mode (for example, a plurality of operating points set between P1 and P2 in FIG. 5), and calculates the amount of air consumed at each determined operating point. Then, the ECU 10 calculates an integrated value of each calculated air amount. This integrated value is stored in the memory 102, etc. as a second consumption air amount Go. The second consumption air amount Go indicates the total amount of air which is sent into the combustion chamber 17 and is consumed by the time the intake air cooling is ended after the boundary between the lean range and the stoichiometric range being crossed.

At the subsequent Step S107, the ECU 10 determines whether the second consumption air amount Go is less than the second residual air amount Gr2. If this determination is YES, the ECU 10 shifts the control process to Step S109. On the other hand, if this determination is NO, the ECU 10 shifts the control process to Step S108.

If the determination at Step S107 is NO (i.e., if the second residual air amount Gr2 is less than the second consumption air amount Go and it shifts to Step S108), the ECU 10 suspends the intake air cooling by the air conditioner 8 as the intake air cooler, in response to a determination that the number of cycles which passed after the calculation of the second residual air amount Gr2 and the second consumption air amount Go exceeds a given second number of cycles.

In detail, the ECU 10 calculates the second consumption air amount Go based on the load of the engine 1 and the engine speed at the timing of Step S108, and calculates the second number of cycles based on the second consumption air amount Go. For example, if the second consumption air amount Go is large, the ECU 10 sets the second number of cycles larger than in the case where the second consumption air amount Go is small. That is, the ECU 10 sets the second number of cycles so that it has a positive correlation with the second consumption air amount Go.

Then, the ECU 10 counts the number of cycles having passed after calculating the second number of cycles, and continues the intake air cooling by the air conditioner 8 until the counted number of cycles reaches the second number of cycles. If the counted number of cycles reaches the second number of cycles, the ECU 10 shifts the control process to Step S109.

On the other hand, if the determination at Step S107 is YES (i.e., if the second consumption air amount Go is less than the second residual air amount Gr2), the ECU 10 ends the intake air cooling by the air conditioner 8, regardless of the number of cycles of the engine 1. In this case, the ECU 10 shifts the control process to Step S109, without performing Step S108.

At Step S109, the ECU 10 controls the air conditioner 8 as the intake air cooler to end the intake air cooling by the air conditioner 8. That is, the ECU 10 according to this embodiment ends the intake air cooling by the intake air cooler in the middle of the transition mode. Step S109 is illustration of the third step.

In detail, the ECU 10 switches the air passage selector valve 87 to the cabin cooling position illustrated in the upper figure of FIG. 3. Thus, the first air cooled by the first heat exchanger 83a of the evaporator 83 flows into the cabin 1003, without flowing into the intake passage 40 from the downstream connecting passage 46. Alternatively or additionally, the ECU 10 may control the driving forces of the radiator fan 70b and the blower 803 to end the intake air cooling.

At subsequent Step S110, the ECU 10 controls the throttle valve 43, etc. as the intake air amount adjuster to end the switching between the first combustion mode and the second combustion mode at a timing after the cooling of intake air by the intake air cooler is finished. After the intake air cooling is finished, the ECU 10 transitions the mode from the transition mode to the first combustion mode or the second combustion mode. Step S110 is illustration of the fourth step.

(Time Chart Corresponding to Each Control Process)

Figure 9A:
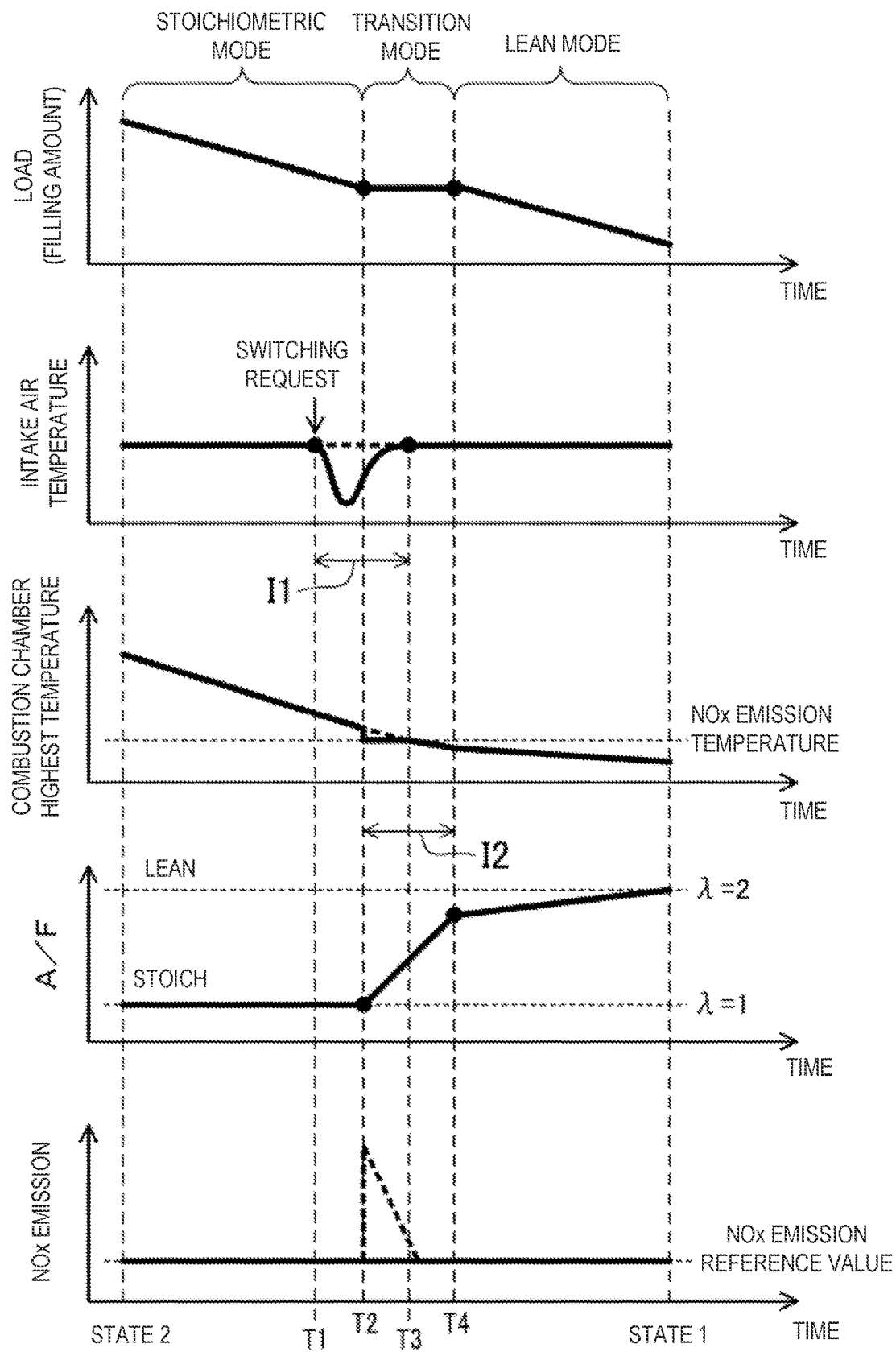
FIG. 9A is a time chart illustrating switching from a stoichiometric mode to a lean mode.
Figure 9B:
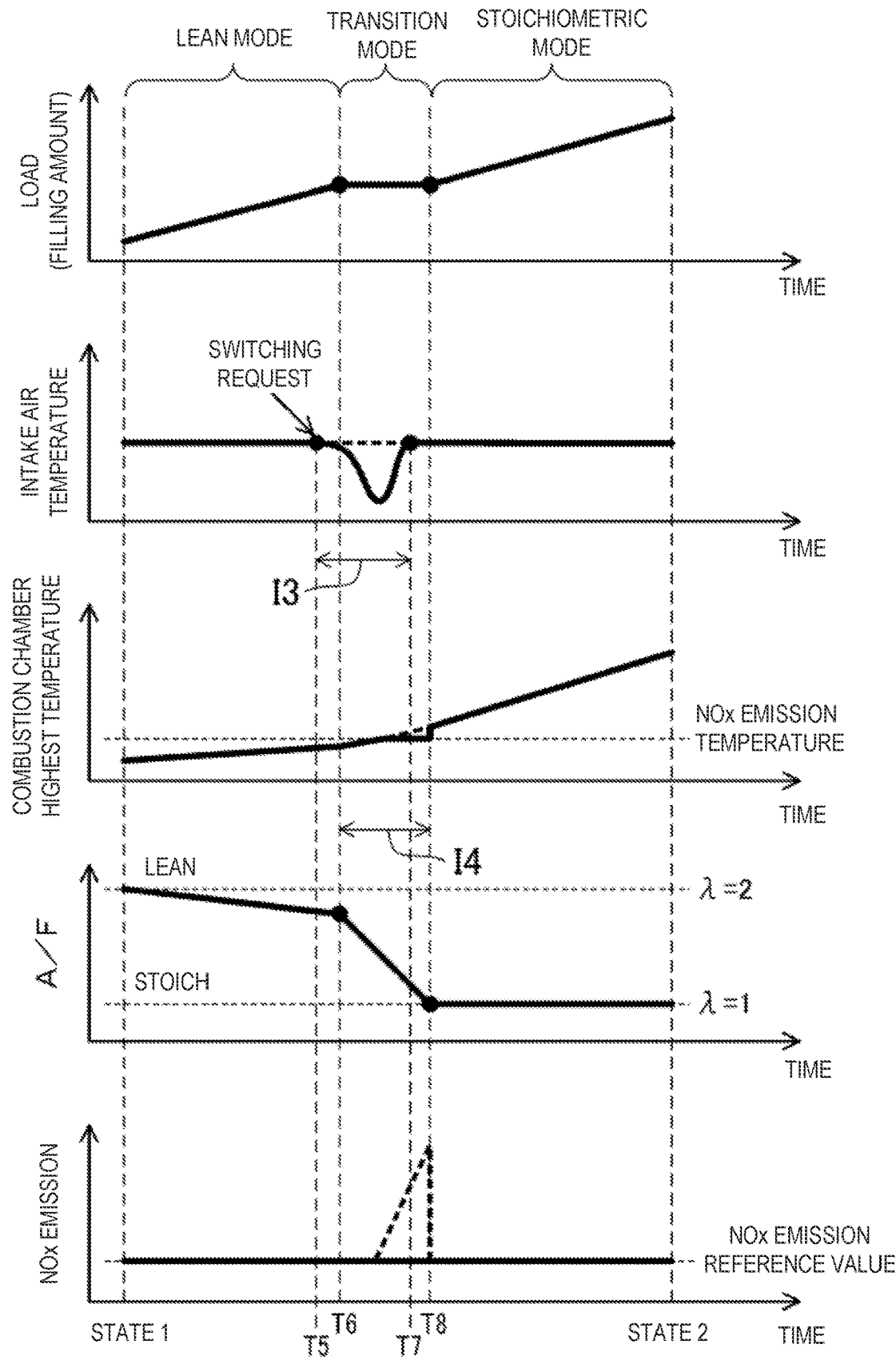
FIG. 9B is a time chart illustrating switching from the lean mode to the stoichiometric mode.

FIG. 9A is a time chart illustrating the switching from the stoichiometric mode (second combustion mode) to the lean mode (first combustion mode). FIG. 9B is a time chart illustrating the switching from the lean mode to the stoichiometric mode.

For example, it is considered that the switching from the second combustion mode in which SPCCI combustion is performed to the first combustion mode in which MPCI combustion is performed. This switching corresponds, for example, to the transition from the first middle-load range 414 to the second middle-load range 415 in FIG. 5.

Here, as a result of loosening a stepping force onto the accelerator pedal in the first middle-load range 414, it is assumed that the switching request from the second combustion mode to the first combustion mode is issued at or immediately before a timing T1. In this case, the ECU 10 starts the intake air cooling by the air conditioner 8, before starting the changing of the air-fuel ratio.

After the intake air cooling begins, the ECU 10 transitions the mode from the second combustion mode to the transition mode at a timing T2, and starts the changing of the air-fuel ratio by the throttle valve 43, etc. As illustrated by a two-direction arrow I1 in FIG. 9A, the timing at which the changing of the air-fuel ratio is started is set so as to fall within the cooling period of intake air. The load of the engine 1 is kept constant during the changing of the air-fuel ratio. Further, since the intake air cooling is performed, the highest temperature inside the combustion chamber 17 (as a result, the $NO_x$ emission) is kept constant. As illustrated by a two-direction arrow 12 in FIG. 9A, the intake air temperature is controlled so as to become the lowest before the adjustment of the air-fuel ratio is started.

In order to adjust the intake air temperature as described above, the ECU 10 controls the capability of cooling the intake air by the intake air cooler so that the cooling capability before the start of the switching from the second combustion mode to the first combustion mode becomes higher than the cooling capability after the start of the switching from the second combustion mode to the first combustion mode. This control is executable by the ECU 10 controlling each operation of the compressor 82, the refrigerant passage selector valve 86, the blower 803, the air passage selector valve 87, and the intake air temperature control valve 48.

After the changing of the air-fuel ratio begins, the ECU 10 ends the intake air cooling by the air conditioner 8 at a timing T3. As illustrated by the two-direction arrow 12 in FIG. 9A, the timing at which the intake air cooling ends is set so as to fall within the period of the adjustment of the air-fuel ratio. After the intake air cooling ends, the highest temperature inside the combustion chamber 17 begins to decrease as the air-fuel ratio increases (i.e., the air increases).

After the intake air cooling ends, the ECU 10 transitions the mode from the transition mode to the first combustion mode at a timing T4, and ends the changing of the air-fuel ratio by the throttle valve 43, etc. After the transition to the first combustion mode, the load of the engine 1 fluctuates according to the accelerator opening, etc., and according to this fluctuation, the air-fuel ratio also fluctuates. That is, in the transition mode, the air-fuel ratio increases while the load of the engine 1 is kept constant, but, in the first combustion mode, the air-fuel ratio fluctuates in an interlocked fashion with the load of the engine 1.

Then, the switching from the first combustion mode to the second combustion mode is described. This switching corresponds, for example, to the transition from the second middle-load range 415 to the first middle-load range 414 in FIG. 5.

Here, as a result of further stepping onto the accelerator pedal in the second middle-load range 415, it is assumed that the switching request from the first combustion mode to the second combustion mode is issued at or immediately before a timing T5. In this case, the ECU 10 starts the intake air cooling by the air conditioner 8, before starting the changing of the air-fuel ratio.

After the intake air cooling begins, the ECU 10 transitions the mode from the first combustion mode to the transition mode at a timing T6 to start the changing of the air-fuel ratio by the throttle valve 43, etc. As illustrated by a two-direction arrow 13 in FIG. 9B, the timing at which the changing of the air-fuel ratio through the transition mode is started is set so as to be fallen within the cooling period of intake air. The load of the engine 1 is kept constant during the changing of the air-fuel ratio. Further, since the intake air cooling is performed, the highest temperature inside the combustion chamber 17 (as a result, the $NO_x$ emission) is kept constant. As illustrated by a two-direction arrow 14 in FIG. 9B, the intake air temperature is controlled so as to become the lowest during the adjustment of the air-fuel ratio.

After the changing of the air-fuel ratio begins, the ECU 10 ends the intake air cooling by the air conditioner 8 at a timing T7. As illustrated by the two-direction arrow 14 in FIG. 9B, the timing at which the intake air cooling ends is set so as to fall within the period of the adjustment of the air-fuel ratio in the transition mode. After the intake air cooling ends, the highest temperature inside the combustion chamber 17 begins to fall as the air-fuel ratio decreases (i.e., the air decreases).

After the intake air cooling ends, the ECU 10 transitions the mode from the transition mode to the second combustion mode at a timing T8, and ends the changing of the air-fuel ratio by the throttle valve 43, etc. After the transition to the second combustion mode, although the load of the engine 1 fluctuates according to the accelerator opening, etc., the air-fuel ratio is maintained at the stoichiometric air-fuel ratio. That is, in the transition mode, the air-fuel ratio increases while the load of the engine 1 is kept constant, but, in the second combustion mode, the air-fuel ratio is maintained at the stoichiometric air-fuel ratio, regardless of the load of the engine 1.

(Control of In-Cylinder Temperature)

As described above, the ECU 10 according to this embodiment starts the intake air cooling before starting the switching between the modes, as illustrated at Steps S101 and S105 in FIG. 8. Thus, since the adjustment of the air-fuel ratio can be started after reducing the in-cylinder temperature to some extent, it becomes advantageous for suppressing the generation of NOR.

Further, the ECU 10 according to this embodiment finishes the adjustment of the air-fuel ratio after the intake air cooling is finished, as illustrated at Steps S109 and S110 in FIG. 8, and FIGS. 9A and 9B. Therefore, the adjustment of the air-fuel ratio can be finished in the state where the intake air temperature is fully lowered, for example, as compared with the configuration in which the adjustment of the air-fuel ratio is finished before the intake air cooling is finished. The effect of suppressing $NO_x$ by the intake air cooling is utilized without waste when adjusting the air-fuel ratio. Thus, the NO emission can be reduced more than the conventional technique.

Further, the ECU 10 according to this embodiment ends the intake air cooling by the intake air cooler in the middle of the transition mode, as illustrated by the period 12 in FIG. 9A and the period 14 in FIG. 9B. Thus, the cooling period by the intake air cooler and the execution period of the transition mode overlap with each other at least in part. Therefore, the period after starting the intake air cooling until finishing the transition mode can be shortened as much as possible. As a result, the switching between the modes can be performed in a shorter time, while fully securing the cooling period of intake air.

Further, for example, if the first consumption air amount Gi is less than the first residual air amount Gr1, non-cooled normal air remains downstream of the intake air cooler (for example, downstream of the intake air temperature control valve 48) at the timing of the intake air amount equivalent to the first consumption air amount Gi being consumed (i.e., the start of the switching between the first combustion mode and the second combustion mode becomes possible). The normal air is higher in the temperature as compared with the air which has already been cooled by the intake air cooler (hereinafter, may also be referred to as "cooled air").

Therefore, since hot normal air will be supplied to the combustion chamber 17 if the switching between the first combustion mode and the second combustion mode is started in a state where the normal air remains, it is inconvenient for suppressing the generation of NOR.

Thus, as illustrated at Steps S103 and S104 in FIG. 8, when the first consumption air amount Gi is less than the first residual air amount Gr1, the ECU 10 according to this embodiment stands by without starting the switching between the first combustion mode and the second combustion mode until the number of cycles exceeds the given first number of cycles. By waiting for the first number of cycles, the switching between the first combustion mode and the second combustion mode can be started in a state where the cooled air is filled in the intake passage 40. Therefore, the generation of NO can further be suppressed.

On the other hand, if the first consumption air amount Gi is larger than the first residual air amount Gr1, at the timing of the amount of air which is equivalent to the first consumption air amount Gi being consumed, and the start of the switching between the first combustion mode and the second combustion mode becomes possible, the normal air does not remain in the intake passage 40 downstream of the intake air cooler, but it is filled with the cooled air.

Thus, as illustrated at Steps S103 and S105 in FIG. 8, if the first consumption air amount Gi is larger than the first residual air amount Gr1, the ECU 10 according to this embodiment promptly starts the switching between the first combustion mode and the second combustion mode, regardless of the number of cycles of the engine 1. Therefore, the switching between the modes can be performed as promptly as possible.

Further, if the first consumption air amount Gi is small, it is considered that a large amount of normal air remains at the timing of the start of the switching between the first combustion mode and the second combustion mode becoming possible. In this case, it is considered that the first number of cycles should be set relatively large. Further, if the first consumption air amount Gi is large, it is considered that a small amount of normal air remains at the timing of the start of the switching between the first combustion mode and the second combustion mode becoming possible. In this case, it is considered that the first number of cycles can be set relatively small.

Thus, the first consumption air amount Gi can be associated with the first number of cycles. Therefore, the ECU 10 according to this embodiment calculates the first number of cycles based on the first consumption air amount Gi, as described in association with Step S104 in FIG. 8. For example, if the first consumption air amount Gi is large, the ECU 10 sets the first number of cycles smaller than in the case where the first consumption air amount Gi is small. Therefore, the first number of cycles can be set appropriately.

Moreover, for example, if the second consumption air amount Go is larger than the second residual air amount Gr2, the cooled air does not remain downstream of the intake air cooler at the timing when the air amount equivalent to the second consumption air amount Go is consumed (i.e., when the completion of switching between the first combustion mode and the second combustion mode becomes possible).

Therefore, if the intake air cooling is shut down immediately in the state where no cooled air remains, and switching between the first combustion mode and the second combustion mode is finished, since hot normal air will be supplied to the combustion chamber 17, it is inconvenient for suppressing the generation of NOR.

Thus, as illustrated at Steps S107 and S108 in FIG. 8, if the second consumption air amount Go is larger than the second residual air amount Gr2, the ECU 10 continues the intake air cooling without suspension until the number of cycles exceeds the given second number of cycles. Therefore, after the intake air cooling is continued over a certain period, switching between the first combustion mode and the second combustion mode can be finished. As a result, the generation of NO can further be suppressed.

On the other hand, if the second consumption air amount Go is less than the second residual air amount Gr2, at the timing of the air amount equivalent to the second consumption air amount Go being consumed and when the completion of the switching between the first combustion mode and the second combustion mode becomes possible, the low-temperature cooled air remains in the intake passage downstream of the intake air cooler.

Thus, as illustrated at Steps S107 and S109 in FIG. 8, if the second consumption air amount Go is less than the second residual air amount Gr2, the ECU 10 according to this embodiment immediately ends switching between the first combustion mode and the second combustion mode, regardless of the number of cycles of the engine 1. Therefore, switching between the modes can be performed as promptly as possible.

Further, if the second consumption air amount Go is small, it is considered that a large amount of cooled air remains at the timing of the completion of the switching between the first combustion mode and the second combustion mode becoming possible. In this case, the second number of cycles can be set relatively small. Further, if the second consumption air amount Go is large, it is considered that a small amount of cooled air remains at the timing of the completion of the switching between the first combustion mode and the second combustion mode becoming possible. In this case, it is considered that the second number of cycles should be set relatively large.

Thus, the second consumption air amount Go can be associated with the second number of cycles. Therefore, the ECU 10 according to this embodiment calculates the second number of cycles based on the second consumption air amount Go, as described in association with Step S108 in FIG. 8. For example, if the second consumption air amount Go is large, the ECU 10 sets the second number of cycles larger than in the case where the second consumption air amount Go is small. Therefore, the second number of cycles can be set appropriately.

Further, if the second combustion mode (stoichiometric mode) is performed on the relatively high-load side like the first middle-load range 414, the in-cylinder temperature becomes relatively high as compared with the first combustion mode (lean mode) on the relatively low-load side like the second middle-load range 415. In this case, in order to suppress the generation of $NO_x$ more certainly when switching from the second combustion mode to the first combustion mode, it is necessary to reduce the in-cylinder temperature more promptly, as compared with the case of switching from the first combustion mode to the second combustion mode.

On the other hand, as illustrated in FIG. 9A, the ECU 10 according to this embodiment sets the cooling capability relatively high at a relatively early timing before the mode change. By improving the cooling capability earlier, the in-cylinder temperature can be reduced more promptly and more certainly.

In more detail, like the engine 1 according to this embodiment, it is considered that the lean mixture gas is combusted by the CI (Compression Ignition) combustion, such as MPCI combustion and HCCI combustion. Since the CI combustion is short in combustion period and since it can depress the piston within a short period of time after a compression top dead center, it contributes to the improvement in thermal efficiency.

However, since the CI combustion is fast in combustion speed, the combustion noise is loud. Further, as the engine load increases, the fuel injection amount increases and the in-cylinder temperature increases. Therefore, the combustion noise also poses a problem. In addition, as the engine load increases, $NO_x$ will be generated when the excess air ratio $\lambda$ becomes less than 2.

Therefore, on the high-load side, it is considered to switch the combustion in the stoichiometric mode (combustion with $\lambda=1$) like the SPCCI combustion and the SI combustion. In this case, the combustion speed becomes slower than the fuel-lean case, and the Nox removal with the catalyst becomes possible because of $\lambda=1$.

However, if configured as described above, since the air-fuel ratio must pass through the intermediate A/F ($1<\lambda<2$) at which raw $NO_x$ is generated and the $NO_x$ purification is not possible with the catalyst when changing the air-fuel ratio from $\lambda=1$ to the fuel lean, the generation of $NO_x$ cannot be avoided.

Meanwhile, as considering the easiness of bonding between oxygen and nitrogen, the generating amount of $NO_x$ depends also on the in-cylinder temperature. When the in-cylinder temperature is higher, $NO_x$ occurs more easily.

Thus, the $NO_x$ emission is determined by the balance between the excess oxygen amount and the in-cylinder temperature. Particularly, since the in-cylinder temperature becomes high during the stoichiometric mode, the $NO_x$ emission tends to increase, even if the excess oxygen is less immediately after the air-fuel ratio change.

On the other hand, like the embodiment, by configuring so that the changing of the air-fuel ratio is finished after the completion of the intake air cooling, the $NO_x$ emission can be suppressed, even if it is immediately after the completion of the changing of the air-fuel ratio. Note that since the in-cylinder temperature is comparatively high during the stoichiometric mode, the ignitability of the mixture gas is secured, even if the intake air cooling is carried out. Further, although the cooled air may be supplied to the combustion chamber 17 even after the completion of the change to the fuel lean, the ignitability is secured as well because the in-cylinder temperature is still hot.

As illustrated in FIG. 3, the heat exchanger of the evaporator 83 of the air conditioner 8 is divided into two, and if there is a cooling demand for the intake air, the intake air is cooled by one of the heat exchangers (the first heat exchanger 83a). Therefore, it is not necessary to additionally provide a heat exchanger and a cooling channel dedicated for the intake air cooling. The intake air can be cooled with the inexpensive and simple structure.

Further, generally, immediately after a startup of the engine 1, the cooling demand for the air inside the cabin 1003 is high and the cooling load of the evaporator 83 is large, whereas, after a warm-up of the engine 1, the cooling load of the evaporator 83 becomes smaller, and therefore, the evaporator 83 has the remaining power. On the other hand, the cooling demand for the intake air becomes high and the improvement effect of thermal efficiency also becomes high after the warm-up of the engine 1, not immediately after the startup of the engine 1.

Therefore, the intake air can be cooled efficiently by utilizing the remaining power of the evaporator 83 of the air conditioner 8. Both the cooling of intake air and the cooling of air inside the cabin 1003 can appropriately be achieved at low cost. Therefore, the thermal efficiency of the engine 1 improves.

Other Embodiments

Although in the above embodiment the air conditioner 8 is used as the intake air cooler, the intake air cooler according to the present disclosure is not limited to the air conditioner 8. For example, the evaporator may be disposed inside the surge tank 42, and this evaporator may be used as the intake air cooler.

Moreover, although in the above embodiment the switching between the MPCI combustion at the lean air-fuel ratio and the SPCCI combustion at the stoichiometric air-fuel ratio is described, the present disclosure is not limited to the switching between such modes.

Figure 10:
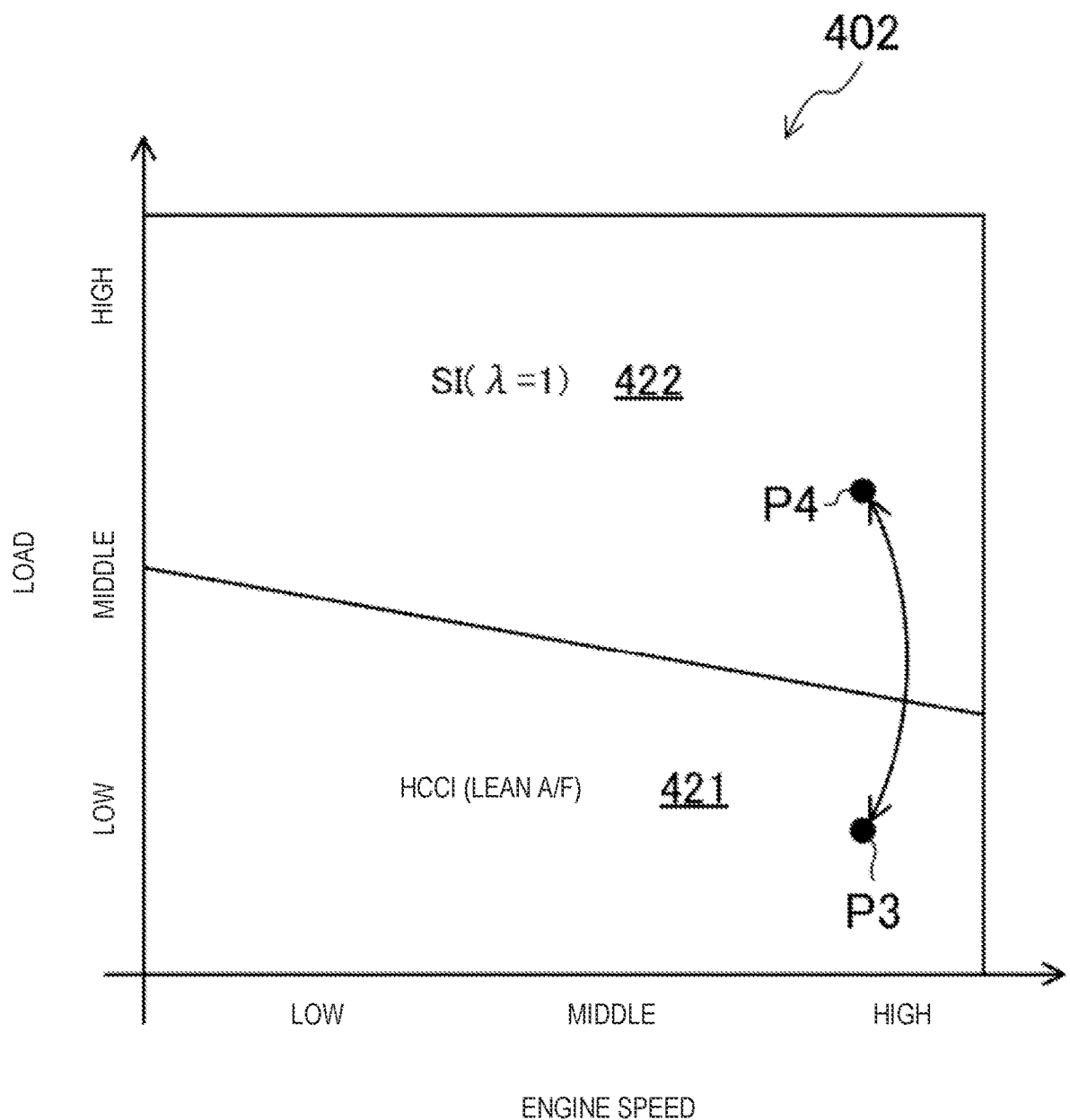
FIG. 10 is a view illustrating a modification of the operating range of the engine.

For example, as illustrated in a base map 402 of FIG. 10, the technology according to the present disclosure is also applicable to the switching between the fuel-lean HCCI combustion as the first combustion mode and the SI combustion at the stoichiometric air-fuel ratio as the second combustion mode. In this case, an operating range 421 on the low-load side corresponds to the operating range where the fuel-lean HCCI combustion is performed and an operating range 422 on the high-load side corresponds to the operating range where the SI combustion at the stoichiometric air-fuel ratio is performed. It is possible to perform a control similar to the above embodiment for switching between HCCI combustion and SI combustion like P3 and P4 in FIG. 10.

It should be understood that the embodiments herein are illustrative and not restrictive, since the scope of the invention is defined by the appended claims rather than by the description preceding them, and all changes that fall within metes and bounds of the claims, or equivalence of such metes and bounds thereof, are therefore intended to be embraced by the claims.

DESCRIPTION OF REFERENCE CHARACTERS

1 Engine
10 ECU (Controller)
11 Cylinder
17 Combustion Chamber
231 Intake S-VT (Intake Air Amount Adjuster)
232 Intake CVVL (Intake Air Amount Adjuster)
241 Exhaust S-VT (Intake Air Amount Adjuster)
242 Exhaust VVL (Intake Air Amount Adjuster)
3 Piston
40 Intake Passage
43 Throttle Valve (Intake Air Amount Adjuster)
6 Injector
8 Air Conditioner (Intake Air Cooler)
80 Air Conditioner Body
802 Air Passage
807 First Division Passage
808 Second Division Passage
81 Condenser
82 Compressor
83 Evaporator
83a First Heat Exchanger
83b Second Heat Exchanger
85 Refrigerant Passage
87 Air Passage Selector Valve

What is claimed is:

1. A control device for an engine, comprising:
a combustion chamber formed by a cylinder and a piston inside the cylinder;
an intake air amount adjuster that adjusts an amount of intake air supplied to the combustion chamber, the intake air amount adjuster including at least one of a valve operating mechanism and a throttle valve;
a controller that controls the intake air amount adjuster to switch a combustion mode, based on an operating state of the engine, between a first combustion mode in which a mixture gas is combusted at a first air-fuel ratio leaner than a stoichiometric air-fuel ratio, and a second combustion mode in which the mixture gas is combusted at a second air-fuel ratio equal to the stoichiometric air-fuel ratio; and
an intake air cooler that cools intake air supplied to the combustion chamber,
wherein the controller is configured to:
control the intake air cooler to start cooling of intake air, in response to issuance of a request for switching the combustion mode between the first combustion mode and the second combustion mode;
after the intake air cooler begins the cooling of intake air, control the intake air amount adjuster to start the switching of the combustion mode; and
control the intake air cooler and the intake air amount adjuster so that the switching of the combustion mode is finished after the cooling of intake air by the intake air cooler is finished.

2. The control device of claim 1,
wherein the controller is able to switch to a transition mode to control the intake air amount adjuster so that the air-fuel ratio inside the combustion chamber is transitioned between the first air-fuel ratio and the second air-fuel ratio, and
wherein the controller is further configured to:
perform the switching of the combustion mode between the first combustion mode and the second combustion mode by the intake air amount adjuster via the transition mode; and
end the intake air cooling by the intake air cooler during the transition mode.

3. The control device of claim 2, wherein the controller is further configured to:
when the request for switching the combustion mode is issued, calculate, based on the operating state of the engine, a first residual air amount that remains inside an intake passage downstream of the intake air cooler after the intake air cooling by the intake air cooler is started, and a first consumption air amount that is consumed by the time the switching of the combustion mode begins;
when the first consumption air amount is less than the first residual air amount, start the switching of the combustion mode, in response to a determination that a number of cycles of the engine that passed after the calculation of the first consumption air amount and the first residual air amount exceeds a given first number of cycles; and
when the first consumption air amount is larger than the first residual air amount, start the switching of the combustion mode, regardless of the number of cycles.

4. The control device of claim 3, wherein the controller calculates the first number of cycles based on the first consumption air amount.

5. The control device of claim 4, wherein the controller is further configured to:
calculate, based on the operating state of the engine, a second residual air amount that remains inside the intake passage downstream of the intake air cooler after the switching of the combustion mode is started, and a second consumption air amount that is consumed by the time the switching of the combustion mode is ended;
when the second consumption air amount is larger than the second residual air amount, suspend the intake air cooling by the intake air cooler, in response to a determination that a number of cycles of the engine after the calculation of the second consumption air amount and the second residual air amount exceeds a given second number of cycles; and
when the second consumption air amount is less than the second residual air amount, suspend the intake air cooling by the intake air cooler, regardless of the number of cycles.

6. The control device of claim 5, wherein the controller calculates the second number of cycles based on the second consumption air amount.

7. The control device of claim 6,
wherein the second combustion mode is performed on a high-load side of the first combustion mode, and
wherein when a request for switching the combustion mode from the second combustion mode to the first combustion mode is issued, the controller controls a cooling capability of intake air by the intake air cooler so that the cooling capability before starting the switching of the combustion mode from the second combustion mode to the first combustion mode becomes higher than the cooling capability after the start of the switching of the combustion mode from the second combustion mode to the first combustion mode.

8. The control device of claim 7,
wherein the intake air cooler is comprised of an air conditioner that air-conditions a cabin of a vehicle, the air conditioner including:
an air passage that guides air to the cabin;
a compressor that discharges refrigerant;
an evaporator that cools the air by heat exchange with the refrigerant; and
a refrigerant passage that circulates the refrigerant through the compressor and the evaporator,
wherein a heat exchanger of the evaporator is divided into a first heat exchanger and a second heat exchanger that are independent from each other,
wherein the air passage includes:
a first division passage where the first heat exchanger is disposed; and
a second division passage where the second heat exchanger is disposed,
wherein an intake system that supplies intake air to the combustion chamber through the intake passage of the engine performs the cooling of intake air by utilizing a part of the air conditioner, the intake system including:
a connecting passage that guides first air to be cooled by passing through the first heat exchanger to the intake passage from the first division passage; and
an air passage selector valve that switches a flow direction of the first air to the air passage or the intake passage, and
wherein the controller is further configured to:
determine a necessity of the intake air cooling based on the operating state of the engine;
when the controller determines that the intake air cooling is necessary, control the air passage selector valve so that the first air flows into the intake passage through the connecting passage; and
when the controller determines that the intake air cooling is not necessary, control the air passage selector valve so that the first air flows into the first division passage.

9. The control device of claim 2, wherein the controller is further configured to:
calculate, based on the operating state of the engine, a second residual air amount that remains inside the intake passage downstream of the intake air cooler after the switching of the combustion mode is started, and a second consumption air amount that is consumed by the time the switching of the combustion mode is ended;
when the second consumption air amount is larger than the second residual air amount, suspend the intake air cooling by the intake air cooler, in response to a determination that a number of cycles of the engine after the calculation of the second consumption air amount and the second residual air amount exceeds a given second number of cycles; and
when the second consumption air amount is less than the second residual air amount, suspend the intake air cooling by the intake air cooler, regardless of the number of cycles.

10. The control device of claim 9, wherein the controller calculates the second number of cycles based on the second consumption air amount.

11. The control device of claim 2,
wherein the second combustion mode is performed on a high-load side of the first combustion mode, and
wherein, when a request for switching the combustion mode from the second combustion mode to the first combustion mode is issued, the controller controls a cooling capability of intake air by the intake air cooler so that the cooling capability before starting the switching of the combustion mode from the second combustion mode to the first combustion mode becomes higher than the cooling capability after the start of the switching of the combustion mode from the second combustion mode to the first combustion mode.

12. The control device of claim 2,
wherein the intake air cooler is comprised of an air conditioner that air-conditions a cabin of a vehicle, the air conditioner including:
an air passage that guides air to the cabin;
a compressor that discharges refrigerant;
an evaporator that cools the air by heat exchange with the refrigerant; and
a refrigerant passage that circulates the refrigerant through the compressor and the evaporator,
wherein a heat exchanger of the evaporator is divided into a first heat exchanger and a second heat exchanger that are independent from each other,
wherein the air passage includes:
a first division passage where the first heat exchanger is disposed; and
a second division passage where the second heat exchanger is disposed,
wherein an intake system that supplies intake air to the combustion chamber through the intake passage of the engine performs the cooling of intake air by utilizing a part of the air conditioner, the intake system including:
a connecting passage that guides first air to be cooled by passing through the first heat exchanger to the intake passage from the first division passage; and
an air passage selector valve that switches a flow direction of the first air to the air passage or the intake passage, and
wherein the controller is further configured to:
determine a necessity of the intake air cooling based on the operating state of the engine;
when the controller determines that the intake air cooling is necessary, control the air passage selector valve so that the first air flows into the intake passage through the connecting passage; and
when the controller determines that the intake air cooling is not necessary, control the air passage selector valve so that the first air flows into the first division passage.

13. The control device of claim 1, wherein the controller is further configured to:
when the request for switching the combustion mode is issued, calculate, based on the operating state of the engine, a first residual air amount that remains inside an intake passage downstream of the intake air cooler after the intake air cooling by the intake air cooler is started, and a first consumption air amount that is consumed by the time the switching of the combustion mode begins;

when the first consumption air amount is less than the first residual air amount, start the switching of the combustion mode, in response to a determination that a number of cycles of the engine that passed after the calculation of the first consumption air amount and the first residual air amount exceeds a given first number of cycles; and when the first consumption air amount is larger than the first residual air amount, start the switching of the combustion mode, regardless of the number of cycles.

14. The control device of claim 13, wherein the controller calculates the first number of cycles based on the first consumption air amount.

15. The control device of claim 1, wherein the controller is further configured to:

calculate, based on the operating state of the engine, a second residual air amount that remains inside the intake passage downstream of the intake air cooler after the switching of the combustion mode is started, and a second consumption air amount that is consumed by the time the switching of the combustion mode is ended;

when the second consumption air amount is larger than the second residual air amount, suspend the intake air cooling by the intake air cooler, in response to a determination that a number of cycles of the engine after the calculation of the second consumption air amount and the second residual air amount exceeds a given second number of cycles; and when the second consumption air amount is less than the second residual air amount, suspend the intake air cooling by the intake air cooler, regardless of the number of cycles.

16. The control device of claim 15, wherein the controller calculates the second number of cycles based on the second consumption air amount.

17. The control device of claim 1,
wherein the second combustion mode is performed on a high-load side of the first combustion mode, and
wherein, when a request for switching the combustion mode from the second combustion mode to the first combustion mode is issued, the controller controls a cooling capability of intake air by the intake air cooler so that the cooling capability before starting the switching of the combustion mode from the second combustion mode to the first combustion mode becomes higher than the cooling capability after the start of the switching of the combustion mode from the second combustion mode to the first combustion mode.

18. The control device of claim 17,
wherein the intake air cooler is comprised of an air conditioner that air-conditions inside a cabin of a vehicle, the air conditioner including:
an air passage that guides air to the cabin;
a compressor that discharges refrigerant;
an evaporator that cools the air by heat exchange with the refrigerant; and
a refrigerant passage that circulates the refrigerant through the compressor and the evaporator,
wherein a heat exchanger of the evaporator is divided into a first heat exchanger and a second heat exchanger that are independent from each other,
wherein the air passage includes:
a first division passage where the first heat exchanger is disposed; and
a second division passage where the second heat exchanger is disposed,
wherein an intake system that supplies intake air to the combustion chamber through the intake passage of the engine performs the cooling of intake air by utilizing a part of the air conditioner, the intake system including:
a connecting passage that guides first air to be cooled by passing through the first heat exchanger to the intake passage from the first division passage; and
an air passage selector valve that switches a flow direction of the first air to the air passage or the intake passage, and
wherein the controller is further configured to:
determine a necessity of the intake air cooling based on the operating state of the engine;
when the controller determines that the intake air cooling is necessary, control the air passage selector valve so that the first air flows into the intake passage through the connecting passage; and
when the controller determines that the intake air cooling is not necessary, control the air passage selector valve so that the first air flows into the first division passage.

19. The control device of claim 1,
wherein the intake air cooler is comprised of an air conditioner that air-conditions a cabin of a vehicle, the air conditioner including:
an air passage that guides air to the cabin;
a compressor that discharges refrigerant;
an evaporator that cools the air by heat exchange with the refrigerant; and
a refrigerant passage that circulates the refrigerant through the compressor and the evaporator,
wherein a heat exchanger of the evaporator is divided into a first heat exchanger and a second heat exchanger that are independent from each other,
wherein the air passage includes:
a first division passage where the first heat exchanger is disposed; and
a second division passage where the second heat exchanger is disposed,
wherein an intake system that supplies intake air to the combustion chamber through the intake passage of the engine performs the cooling of intake air by utilizing a part of the air conditioner, the intake system including:
a connecting passage that guides first air to be cooled by passing through the first heat exchanger to the intake passage from the first division passage; and
an air passage selector valve that switches a flow direction of the first air to the air passage or the intake passage, and
wherein the controller is further configured to:
determine a necessity of the intake air cooling based on the operating state of the engine;
when the controller determines that the intake air cooling is necessary, control the air passage selector valve so that the first air flows into the intake passage through the connecting passage; and
when the controller determines that the intake air cooling is not necessary, control the air passage selector valve so that the first air flows into the first division passage.

20. The control device of claim 1, wherein the intake air amount adjuster includes at least one of the valve operating mechanism, the valve operating mechanism being any of an intake sequential-valve timing (S-VT), an intake continuously variable valve lift (CVVL), an exhaust 5-VT, and an exhaust variable valve lift (VVL).

* * * * *